United States Patent
Iino et al.

(10) Patent No.: US 8,252,484 B2
(45) Date of Patent: Aug. 28, 2012

(54) SEPARATOR FOR FUEL CELL HAVING ELECTRICALLY CONDUCTING FLOW PATH PART

(75) Inventors: Tadashi Iino, Kawasaki (JP); Zenichiro Izumi, Kawasaki (JP); Yukihito Tanaka, Wako (JP); Toshiki Kawamura, Wako (JP)

(73) Assignees: Showa Denko K.K., Tokyo (JP); Honda Motor Co., Ltd., Tokyo (JP)

( * ) Notice: Subject to any disclaimer, the term of this patent is extended or adjusted under 35 U.S.C. 154(b) by 599 days.

(21) Appl. No.: 12/442,701

(22) PCT Filed: Sep. 27, 2007

(86) PCT No.: PCT/JP2007/069422
§ 371 (c)(1),
(2), (4) Date: Mar. 24, 2009

(87) PCT Pub. No.: WO2008/041736
PCT Pub. Date: Apr. 10, 2008

(65) Prior Publication Data
US 2010/0047650 A1 Feb. 25, 2010

(30) Foreign Application Priority Data
Sep. 29, 2006 (JP) .................. 2006-268668

(51) Int. Cl.
*H01M 4/64* (2006.01)
(52) U.S. Cl. ......... 429/519; 429/520; 429/521; 429/514
(58) Field of Classification Search .......... 429/521, 429/520, 519, 518, 517, 514, 513; 252/502, 252/510, 511; 264/105
See application file for complete search history.

(56) References Cited

U.S. PATENT DOCUMENTS 6,395,416 B1  5/2002  Tanemoto et al.
6,468,685 B1  10/2002  Yoshida
(Continued)

FOREIGN PATENT DOCUMENTS
EP   1291937   3/2003
(Continued)

OTHER PUBLICATIONS

Korean Office Action for corresponding KR Application No. 10-2009-7003280, Oct. 19, 2010.
(Continued)

*Primary Examiner* — Raymond Alejandro
(74) *Attorney, Agent, or Firm* — Ditthavong Mori & Steiner, P.C.

(57) ABSTRACT

A high-performance separator for a fuel cell is provided that includes an electrically conducting flow path part and an integrated insulating outer circumferential part surrounding the flow path part. The flow path part includes an electrically conducting resin composition including a carbonaceous material (A) and a thermoplastic resin composition (B) at a mass ratio (A)/(B) of 1 to 20 with the total mass of (A) and (B) accounting for 80 to 100 mass % in the composition. The flow path part has a corrugated shape having a recess and a projection on each of front and back surfaces thereof, where the recess constitutes a groove for a flow path, and a thickness of 0.05 to 0.5 mm and a maximum thickness/minimum thickness ratio of 1 to 3. The insulating outer circumferential part includes an insulating thermoplastic resin composition having a volume resistivity of $10^{10}$ Ωcm or more.

15 Claims, 23 Drawing Sheets

U.S. PATENT DOCUMENTS

| | | | |
|---|---|---|---|
| 2002/0182473 A1 | 12/2002 | Blunk et al. | |
| 2004/0023095 A1* | 2/2004 | Middelman et al. | 429/34 |
| 2004/0110057 A1 | 6/2004 | Yoshimoto et al. | |
| 2004/0197633 A1 | 10/2004 | Yamamoto et al. | |
| 2004/0241544 A1 | 12/2004 | Nakaishi et al. | |
| 2005/0202297 A1 | 9/2005 | Schmitz et al. | |
| 2005/0244700 A1 | 11/2005 | Abd Elhamid et al. | |
| 2006/0027790 A1 | 2/2006 | Arai et al. | |
| 2006/0263667 A1* | 11/2006 | Toro | 429/38 |
| 2011/0143022 A1* | 6/2011 | Jang et al. | 427/115 |

FOREIGN PATENT DOCUMENTS

| | | |
|---|---|---|
| JP | 60-161144 | 8/1985 |
| JP | 08-222241 | 8/1996 |
| JP | 2000-208154 | 7/2000 |
| JP | 2001-052721 | 2/2001 |
| JP | 2001-068128 | 3/2001 |
| JP | 2001-196076 | 7/2001 |
| JP | 2001-216977 | 8/2001 |
| JP | 2002-008685 | 1/2002 |
| JP | 2003-22816 | 1/2003 |
| JP | 2003-282084 | 10/2003 |
| JP | 2004-345120 | 12/2004 |
| JP | 2005-235631 | 9/2005 |
| JP | 2005-285552 * | 10/2005 |
| JP | 2006-62103 | 3/2006 |
| KR | 2002-0084159 | 11/2002 |
| KR | 2004-0048315 | 6/2004 |
| WO | WO 01/80339 | 10/2001 |
| WO | WO 03/049212 | 6/2003 |
| WO | WO 03/085760 | 10/2003 |
| WO | WO 2005/055351 | 6/2005 |
| WO | WO 2005/117178 | 12/2005 |

OTHER PUBLICATIONS

Japanese Office Action for corresponding JP Application No. 2006-268668, Mar. 13, 2012.

* cited by examiner

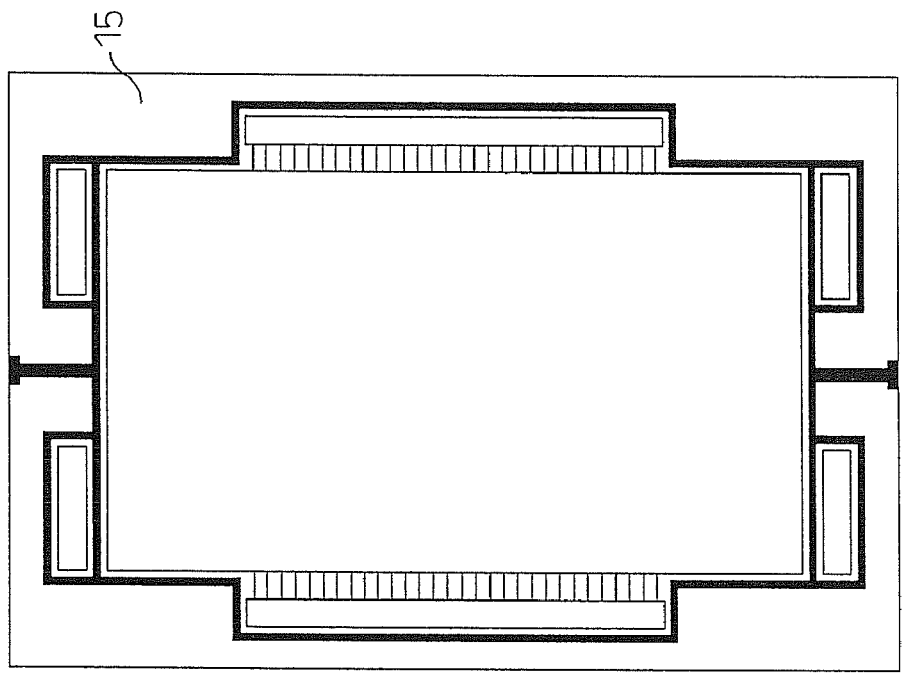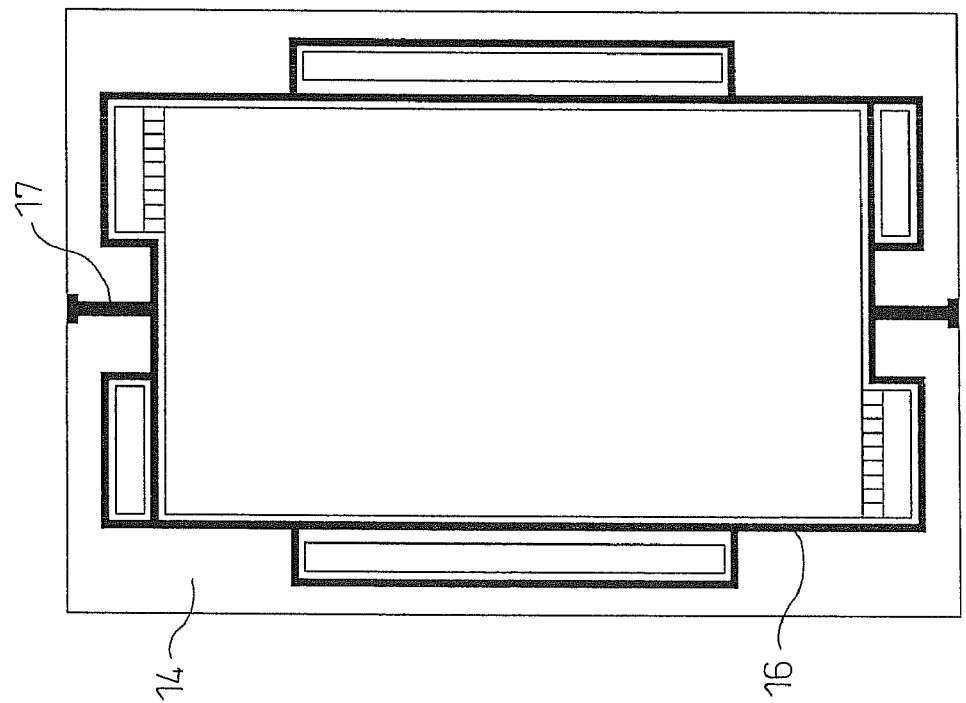
Fig.9

Fig.17
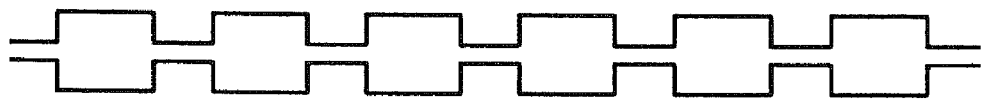
Fig.18
⟨EXAMPLE 1⟩
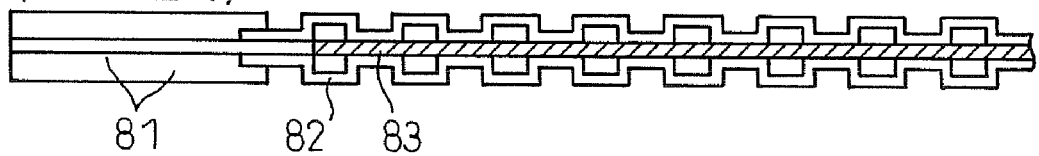
81　　82　83
⟨COMPARATIVE EXAMPLE 1⟩
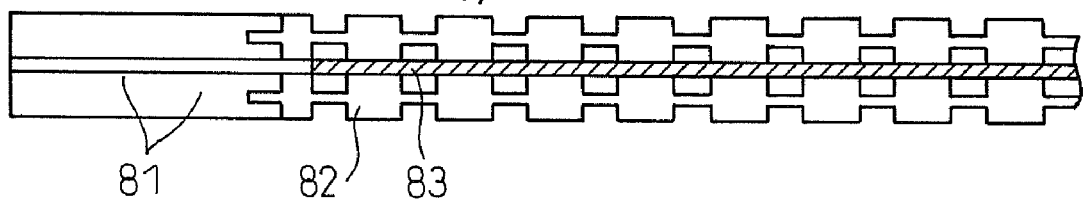
81　　82　83

Fig.20
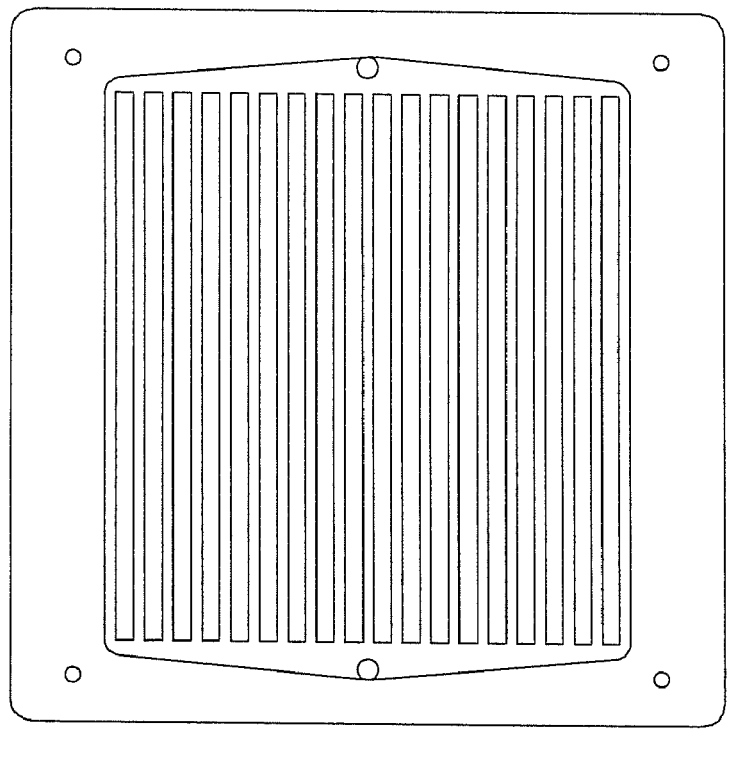
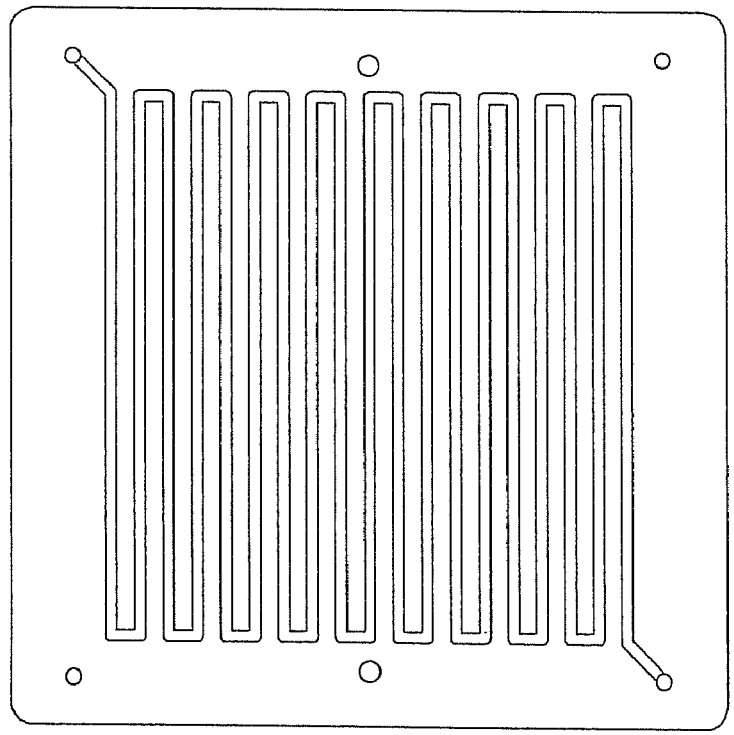

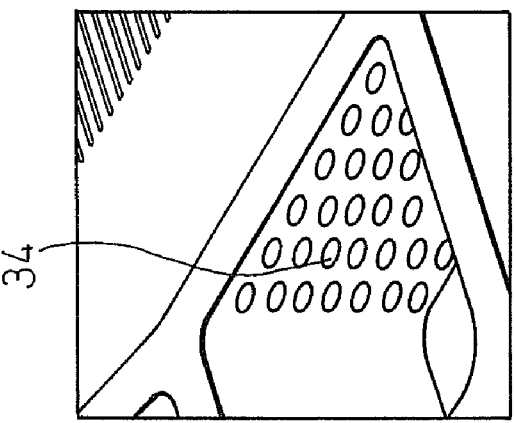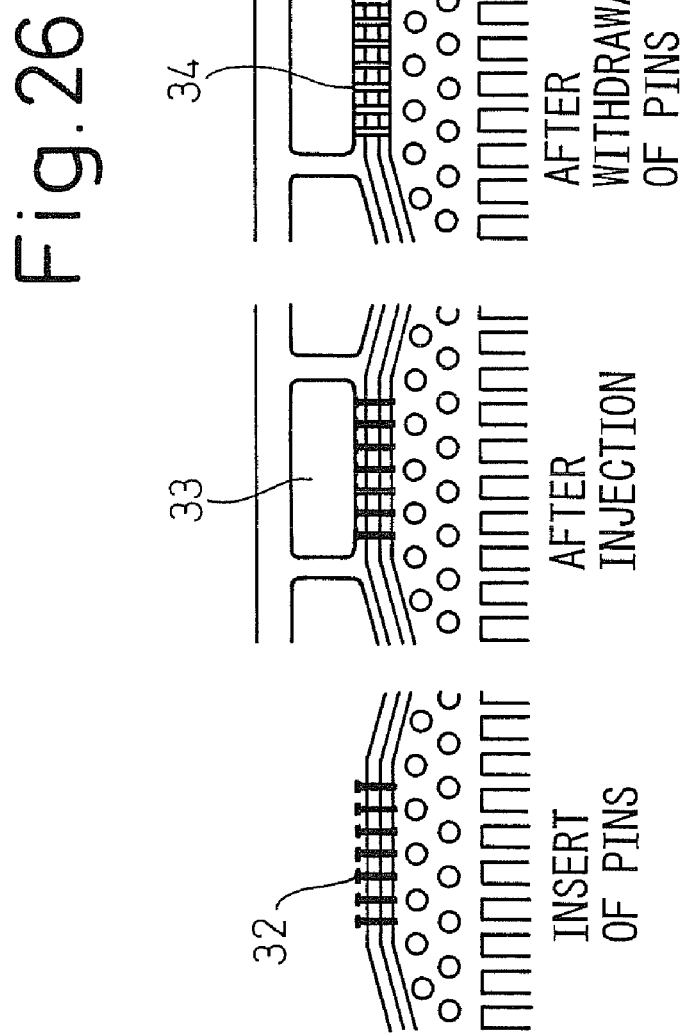

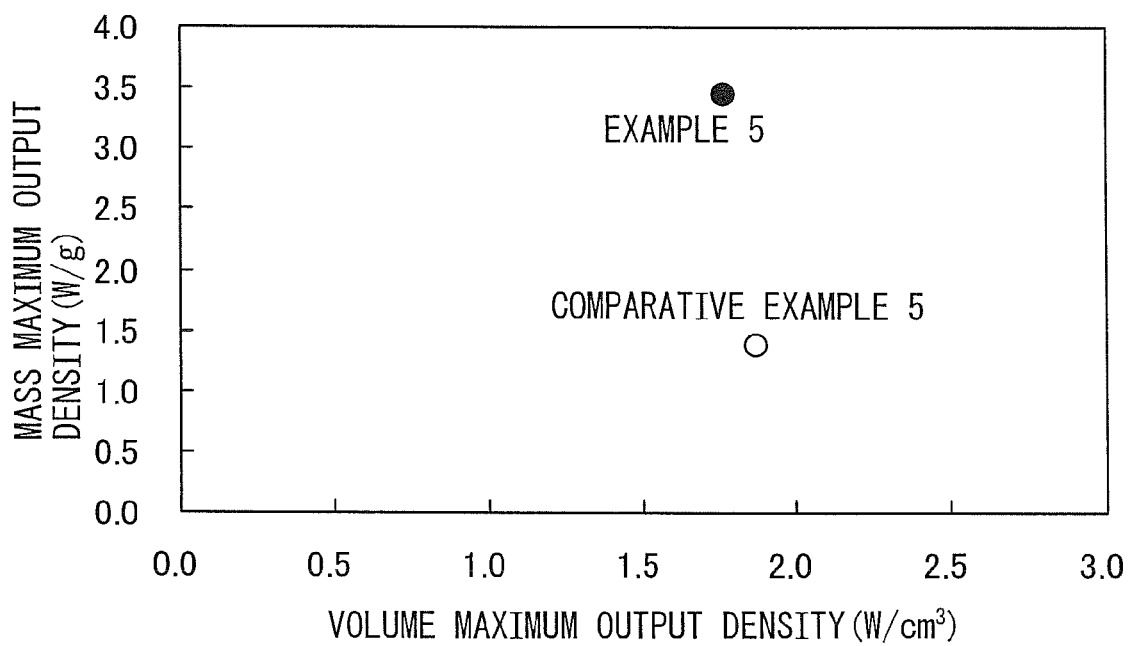

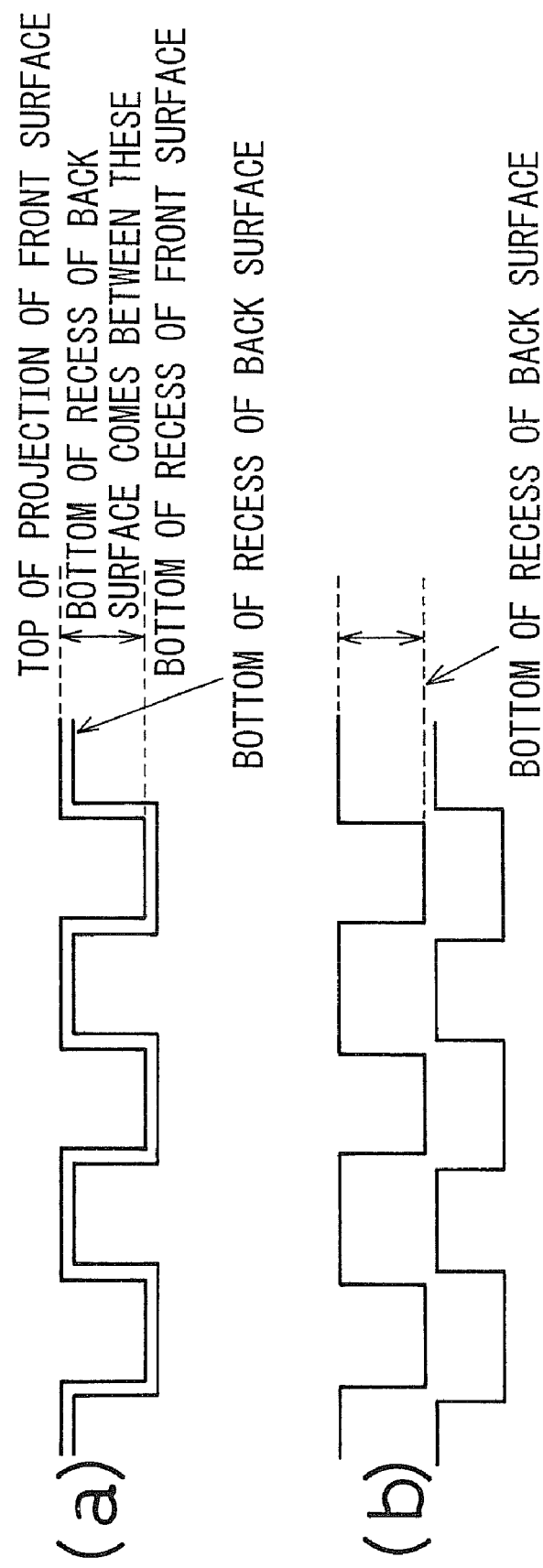

SEPARATOR FOR FUEL CELL HAVING ELECTRICALLY CONDUCTING FLOW PATH PART

TECHNICAL FIELD

The present invention relates to a fuel cell separator comprising an electrically conducting resin composition, which is excellent in electrical conductivity and mechanical characteristics, is lightweight and compact and enables the construction of a fuel cell stack without using a gasket or packing, and also relates to a single cell unit for a fuel cell and a short stack unit for a fuel cell, each using the separator, and production methods of a separator for a fuel cell and a cell unit (single cell unit or short stack unit) for a fuel cell.

BACKGROUND ART

In recent years, from the standpoint of environmental issues and energy problems, fuel cells have been attracting attention. A fuel cell is a clean power generating device which generates electric power by a reverse electrolysis reaction of water using hydrogen and oxygen and discharges only water, which is classified into several species according to the kind of the electrolyte and among these, a solid polymer-type fuel cell operates at a low temperature and is most promising for automobile or electrical appliances. Such a fuel cell is fabricated, for example, by stacking single cells each comprising a polymer solid electrolyte, a gas diffusing electrode, a catalyst and a separator, whereby high-output power generation can be achieved.

The fuel cell having the above-described construction has a separator for dividing single cells. A flow path (groove) for supplying a fuel gas (e.g., hydrogen) and an oxidant gas (e.g., oxygen) and for discharging water (water vapor) generated is usually formed on the separator. Therefore, the separator is required to have high gas impermeability enabling complete separation of these gases and high electrical conductivity for decreasing internal resistance. Furthermore, the separator is required to be excellent in heat conductivity, durability, strength and the like.

For the purpose of satisfying these requirements, the separator for a fuel cell has been studied from both aspects of a metal material and a carbon material. The metal material has a large specific gravity, but is advantageous in that a thin separator can be fabricated because of its excellent mechanical properties, and moreover electrical conductivity is high. However, there is a problem in corrosion resistance. Studies are being made on the design of a surface treatment or composition that has excellent corrosion resistance.

On the other hand, many studies have also been made with regard to the carbon material, and examples of the material for the fuel cell separator include a molded article obtained by press-molding an expanded graphite sheet, a molded article obtained by impregnating a carbon sintered body with a resin and curing it, a glass-like carbon obtained by firing a thermosetting resin, and a molded article obtained by mixing a carbon powder and a resin and molding the mixture.

For example, Patent Document 1 discloses a complicated process of adding a binder material to a carbonaceous powder, mixing these under heating, subjecting the mixture to CIP molding (cold isostatic pressing), firing and graphitization, impregnating the obtained isotropic graphite material with a thermosetting resin and after curing, engraving a groove by cutting.

Also, Patent Document 2 discloses a technique of impregnating carbon powder- or carbon fiber-containing paper sheets with a thermosetting resin, stacking and press-bonding the paper sheets, and firing the stack, and Patent Document 3 discloses a technique of injection molding a phenol resin in a separator-shaped mold, and firing the molded article.

Such a material obtained through firing as in these examples exhibits high electrical conductivity and high heat resistance, but has problems that firing takes a long time to make the productivity low or that brittle destruction readily occurs. Furthermore, in the case where cutting is necessary, mass productivity is decreased and cost rises. For these reasons, the material will be difficult to spread in the future.

Meanwhile, reduction in contact resistance, which is a factor governing the electrical conductivity of the fuel cell separator is important. Some attempts have been made to reduce the contact resistance by devising a separator structure. For example, Patent Document 4 discloses a technique of coating a separator surface with a metal or carbon having high electrical conductivity, Patent Document 5 discloses a technique of applying an electrically conducting polymer to the surface of a molded article of an electrically conducting resin composition, and Patent Document 6 discloses a technique of applying an electrically conducting material to the surface or embedding it in the inside in the longitudinal direction.

Furthermore, gas shielding of the fuel cell is performed by using a gasket or a packing, and the outer circumferential part of the stack is treated for insulation so as to prevent a short-circuit. For this purpose, a cell stack has been conventionally fabricated by individually prepared seal parts. Accordingly, the process of stacking several hundreds to several thousands of sheets takes a long time and is cumbersome. Considering these problems, for the purpose of reducing the number of parts as much as possible, there has been recently disclosed a technique, for example, in Patent Document 7, where a separator having a power generating part composed of a carbon-based material and an outer frame portion composed of an electrically non-conducting polymer material is processed by insert molding. In Patent Document 8, a technique where a separator and a gasket are integrated is disclosed.

In addition, Patent Document 9 discloses a technique of cutting the resin-rich layer (a layer rich in resin) on the separator surface to increase the area ratio of carbon powder on the surface, and Patent Document 10 discloses a technique of using rubber for the binder to enhance the adhesion on the contact surface and decrease the contact resistance.

[Patent Document 1] Kokai (Japanese Unexamined Patent Publication) No. 8-222241
[Patent Document 2] Kokai No. 60-161144
[Patent Document 3] Kokai No. 2001-68128
[Patent Document 4] Kokai No. 2001-196076
[Patent Document 5] Kokai No. 2002-8685
[Patent Document 6] Kokai No. 2001-52721
[Patent Document 7] WO 01/80339
[Patent Document 8] Kokai No. 2005-235631
[Patent Document 9] Kokai No. 2003-282084
[Patent Document 10] Kokai No. 2001-216977

As described above, the separator for a fuel cell is conventionally required to satisfy particularly high electrical conductivity, gas impermeability, strong corrosion resistance and low cost. Furthermore, a lightweight and compact separator capable of exerting its high performance in a limited space is demanded. In addition, a member which can dispense with a gas seal member and enables the fabrication of a fuel cell in a short time is demanded.

Regarding the separator, a resin mold-type carbon-based material not requiring a cutting step has been recently paid attention to, and is also being developed. However, although the amount of the electrical conductivity-imparting material packed needs to be greatly increased to express high electrical conductivity, reduction in the resin content is limited for maintaining moldability and sufficiently high electrical conductivity cannot be obtained. Also, the carbon-based separator has a low specific gravity as compared with metal and can advantageously contribute to lightweighting, but when the thickness is reduced, cracking readily occurs and the reliability of gas shielding decreases. In this way, a separator as thin as a metal separator is difficult to produce.

Furthermore, in the case of a conventional separator, as shown in FIG. 28, the flow path has a shape of symmetry from front to back and has a largely uneven thickness and when the material has a high viscosity, the processability is bad and a difference in density is readily produced between the thick part and thin part. Therefore, high flowability is required for molding a separator with excellent surface precision.

In the case of fabricating a fuel cell stack, a gasket or a packing is mainly used to prevent the escape of gas, but since the number of fabrication steps increases and the process becomes cumbersome, a structure not using such a gasket or packing is needed. Furthermore, the fuel cell stack is fabricated by applying an insulating treatment to the outer circumference so as to prevent shortcircuit, but elimination of this step is needed.

An object of the present invention is to overcome these drawbacks of conventional techniques and provide a lightweight, compact and high-performance fuel cell separator, a cell unit (single cell unit or short stack unit) for a fuel cell, and production methods thereof.

DISCLOSURE OF INVENTION

As a result of intensive studies, the present inventors have found that a thin separator having a corrugated flow path can be molded at a high speed by a processing method of molding a thermoplastic resin composition highly filled with a carbonaceous material into a thin sheet form, heating the sheet to a melted state, and cold-shaping the melt at a high speed; and also found that such a corrugated thin separator is very effective for solving the above-described problems of conventional techniques. The present invention has been accomplished based on these findings.

The present inventors have further proceeded with studies, as a result, it has been found that particularly when the flow path is formed in a corrugated shape with less unevenness in the thickness, the process is only to change the shape almost without flowing the material and application of a high-viscosity material highly filled with a filler is optimal, and also found that since the thin separator of the present invention having the above-described construction is highly filled with a carbonaceous material to ensure very high heat conductivity and enable rapid solidification, high-speed cold shaping by stamp-molding is effective.

In addition, as a result of continual studies, the present inventors have found that when the gas/refrigerant flow path part composed of the above-described composite material of a resin and a carbonaceous material and the outer circumference of the cell are covered with an insulating thermoplastic resin composition, a gas seal in a seal part formed by heat-welding can be provided. Furthermore, it has been found that when separators or cells are heat-welded with each other and thereby integrated, this is effective for decreasing the number of parts and fabricating the stack in a short period of time, and such a module has been also accomplished.

In other words, the present invention includes, for example, the embodiments in the following embodiments [1] to [27]

[1] A separator for a fuel cell, comprising an electrically conducting flow path part and an insulating outer circumferential part surrounding the electrically conducting flow path part; wherein the electrically conducting flow path part comprises an electrically conducting resin composition comprising a carbonaceous material (A) and a thermoplastic resin composition (B) at a mass ratio (A)/(B) of 1 to 20 with the total mass of (A) and (B) accounting for 80 to 100 mass % in the composition;

the electrically conducting flow path part has a corrugated shape having a recess and a projection on each of front and back surfaces thereof, where the recess constitutes a groove for a flow path;

the electrically conducting flow path part has a thickness of 0.05 to 0.5 mm and a maximum thickness/minimum thickness ratio of 1 to 3;

the insulating outer circumferential part comprises an insulating thermoplastic resin composition having a volume resistivity of $10^{10}$ Ωcm or more; and the electrically conducting path part and the insulating circumferential part are integrated.

[2] The separator for a fuel cell as set forth in [1], wherein a terminal for measuring the cell voltage is protruded from the electrically conducting flow path part to the outside of the insulating resin outer circumferential part.

[3] The separator for a fuel cell as set forth in [1] or [2], wherein the density of the electrically conducting flow path part is from 1.2 to 2.5 g/cm$^3$.

[4] The separator for a fuel cell as set forth in any one of [1] to [3], wherein the recess of the electrically conducting flow path part has a curved shape in the cross section and the projection has a flat surface.

[5] The separator for a fuel cell as set forth in any one of [1] to [4], wherein in the cross section of the electrically conducting flow path part, an offset allowing flat surfaces of the projections to overlap by from 0.05 to 0.5 mm between front and back surfaces is provided.

[6] The separator for a fuel cell as set forth in any one of [1] to [5], wherein the thermoplastic resin composition (B) and the insulating thermoplastic resin composition each comprises a component having a glass transition temperature of −20° C. or less.

[7] The separator for a fuel cell as set forth in any one of [1] to [6], wherein the thermoplastic resin composition (B) and the insulating thermoplastic resin composition each comprises from 0.05 to 30 mass % of an elastomer component (C).

[8] The separator for a fuel cell as set forth in [7], wherein the average particle diameter of the elastomer component (C) is from 0.01 to 5 μm and is smaller than the average particle diameter or average fiber length of the carbonaceous material (A).

[9] The separator for a fuel cell as set forth in any one of [1] to [8], wherein the thermoplastic resin composition (B) and the insulating thermoplastic resin composition each comprises a crystalline hydrocarbon-based polymer having a melting point of 100° C. or more.

[10] The separator for a fuel cell as set forth in any one of [1] to [9], wherein the carbonaceous material (A) comprises from 0.05 to 5 mass % of boron.

[11] The separator for a fuel cell as set forth in any one of [1] to [10], wherein the carbonaceous material (A) comprises from 0.1 to 50 mass % of at least either one of a vapor grown carbon fiber and a carbon nanotube each having a diameter of 200 nm or less.

[12] The separator for a fuel cell as set forth in any one of [1] to [11], wherein out of the electrically conducting flow path part and the insulating thermoplastic resin composition, both members comprise at least one same polymer, at least one member comprises a compatibilizer, or one member comprises one component working out to a pair of polymers having miscibility or compatibility while another member comprising another component working out to the pair of polymers having miscibility or compatibility.

[13] The separator for a fuel cell as set forth in any one of [1] to [12], wherein in at least either one of the electrically conducting flow path part and the insulating outer circumferential part, the melting point of the outer layer on at least one side out of the front and back surfaces is lower than the melting point of the center layer.

[14] The separator for a fuel cell as set forth in any one of [1] to [13], wherein the flexural modulus of the insulating outer circumferential part is from $4/5$ to $1/200$ of the flexural modulus of the electrically conducting flow path part.

[15] The separator for a fuel cell as set forth in any one of [1] to [14], wherein the average linear expansion coefficient of the insulating outer circumferential part is from $1/7$ to 7 of the average linear expansion coefficient of the electrically conducting flow path part.

[16] A method for producing a separator for a fuel cell, comprising the steps of:
preparing a sheet comprising an electrically conducting resin composition comprising a carbonaceous material (A) and a thermoplastic resin composition (B) at a mass ratio (A)/(B) of 1 to 20 with the total mass of (A) and (B) accounting for 80 to 100 mass % in the composition;
heating the sheet to its melting temperature;
inserting the heated sheet into a mold set to not more than the solidification temperature of the sheet and then stamp-molding the sheet to prepare an electrically conducting flow path part with a corrugated shape having a recess and a projection; and
integrally forming an insulating outer circumferential part to surround the electrically conducting flow path part.

[17] The method for producing a separator for a fuel cell as set forth in [16], wherein the step of integrally forming an insulating outer circumferential part is a step of injection molding the insulating outer circumferential part to surround the electrically conducting flow path part in the state of the electrically conducting flow path part being inserted into the mold.

[18] The method for producing a separator for a fuel cell as set forth in [16], wherein the step of integrally forming an insulating outer circumferential part comprises a step of molding the insulating outer circumferential part separately from the electrically conducting flow path part, and a step of stacking the separately molded electrically conducting flow path part and insulating outer circumferential part and integrating these parts by heat-welding their boundary surfaces by means of an energy source selected from an ultrasonic wave, a laser, a high-frequency wave, an infrared ray and an electricity.

[19] A method for producing a separator for a fuel cell, comprising the steps of:
preparing an electrically conducting sheet comprising an electrically conducting resin composition comprising a carbonaceous material (A) and a thermoplastic resin composition (B) at a mass ratio (A)/(B) of 1 to 20 with the total mass of (A) and (B) accounting for 80 to 100 mass % in the composition;
preparing an insulating sheet comprising an insulating resin composition;
charging the electrically conducting sheet and the insulating sheet each in a melted state into a mold, or charging the electrically conducting sheet and the insulating sheet into a mold and then heating these sheets to a melted state; and
performing shaping and welding at the same time by a cold pressing machine.

[20] A single cell unit for a fuel cell, obtained by stacking the separator for a fuel cell as set forth in any one of [1] to [15] and an MEA having a resin-made frame body in the outer circumference.

[21] A short stack unit for a fuel cell, comprising the single cell unit for a fuel cell as set forth in [20].

[22] The short stack unit for a fuel cell as set forth in [21], wherein the insulating outer circumferential part of the separator for a fuel cell and the frame body of the MEA are integrated.

[23] A method for producing the cell unit (single cell unit or short stack unit) for a fuel cell as set forth in [22], comprising the steps of:
stacking the separator for a fuel cell and the MEA; and
integrating the insulating outer circumferential part of the separator for a fuel cell and the frame body of the MEA.

[24] The method for producing a cell unit (single cell unit or short stack unit) for a fuel cell as set forth in [23], wherein the insulating outer circumferential part of the separator for a fuel cell and the frame body of the MEA are integrated by heat-welding.

[25] The method for producing a cell unit (single cell unit or short stack unit) for a fuel cell as set forth in [23], wherein the insulating outer circumferential part of the separator for a fuel cell and the frame body of the MEA are integrated by injection molding of inserting the separator for a fuel cell and the MEA in the stacked state into a mold and integrating the insulating outer circumferential part of the separator for a fuel cell and the frame body of the MEA.

[26] A method for producing a cell unit (single cell unit or short stack unit) for a fuel cell, comprising the steps of:
preparing a sheet comprising an electrically conducting resin composition comprising a carbonaceous material (A) and a thermoplastic resin composition (B) at a mass ratio (A)/(B) of 1 to 20 with the total mass of (A) and (B) accounting for 80 to 100 mass % in the composition;
heating the sheet to its melting temperature;
inserting the heated sheet into a mold set to not more than the solidification temperature of the sheet and then stamp-molding the sheet to prepare an electrically conducting flow path part;
stacking the electrically conducting flow path part and an MEA; and
inserting the stack of the electrically conducting flow path part and an MEA into a mold and then integrally forming an insulating outer circumferential part to surround the stack.

[27] The method for producing a cell unit (single cell unit or short stack unit) for a fuel cell as set forth in any one of [23] to [26], which further comprises a step of post-forming an introduction hole for introducing a gas or a refrigerant into a flow path provided in the electrically conducting flow path part from an internal manifold penetrating the insulating outer circumferential part in the stacking direction.

The member for a fuel cell of the present invention is lightweight and compact and can enhance the characteristics of a fuel cell. Also, according to the production method of the present invention, a groove can be formed on both surfaces of a sheet comprising an electrically conducting resin composition at a high speed by stamp-molding and a structure enabling the fabrication of a stack without using a gasket or a packing can be obtained, so that a separator for a fuel cell, a single cell unit for a fuel cell, and a short stack unit for a fuel cell, capable of realizing an inexpensive high-performance fuel cell, can be provided.

BRIEF DESCRIPTION OF DRAWINGS

FIG. 9 is a schematic view showing one example of the fuel cell separator having an electrically conducting part for electrical energization welding.

FIG. 17 is a schematic cross-sectional view of the separator for a fuel cell obtained in the Comparative Examples of the present invention.

FIG. 18 is a partial schematic cross-sectional view showing one example of the single cell unit for a fuel cell of the present invention.

FIG. 20 is an overall schematic view of the separator for a fuel cell obtained in Comparative Examples of the present invention.

FIG. 26 is a view for explaining one example of the method for processing the introduction holes for introducing a gas or refrigerant from an internal manifold penetrating in the stacking direction the insulating outer circumferential part of the cell unit for a fuel cell of the present invention to the flow path provided in the electrically conducting flow path part.

FIG. 27 is a view showing the output test results of the cell units obtained in Example 5 and Comparative Example 5 of the present invention.

FIG. 29 is a schematic cross-sectional view showing one example of the preferred corrugated shape.

Figure 1:
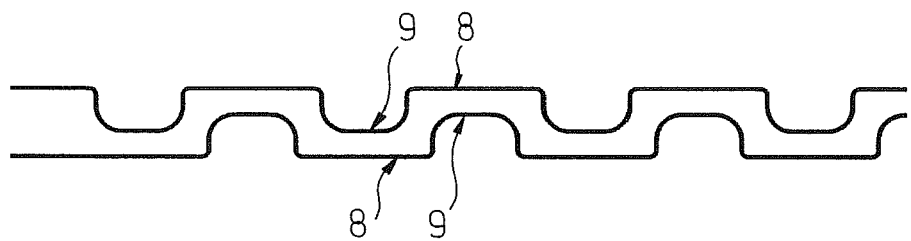
FIG. 1 is a schematic cross-sectional view showing one example of the corrugated electrically conducting flow path part of the present invention.

In the Drawings, 1 is an insulating outer circumferential part, 1' is an insulating outer circumferential part of MEA, 2 is an electrically conducting flow path part, 3 is a cell terminal, 4 is an MEA, 5 is a solid polymer electrolyte membrane (ion exchange membrane), 6 is a gas diffusing layer (carbon paper), 6a is a carbon paper, 7 is a flow path (for reaction gas), 8 is a projection, 9 is a recess, 10 is an offset of the flow path projection between front and back surfaces, 11 is a separator (specimen), 11a is a separator, 12 is a supporting plate (gold-plated brass plate), 13 is a surface portion of welded separator, 14 is a separator front surface, 15 is a separator back surface, 16 is a seal part, 17 is an electrical energization terminal, 17a is a terminal for passing electricity to the portion intended to weld, 18 is a hot plate, 19 is a quartz glass, 20 is a pressing jig, 21 is a power source, 22 is a stacked body (electrically conducting flow path part+MEA), 22a is a stacked body of electrically conducting flow path part and MEA (insert component), 23 is an injection molded material (insulating outer circumferential part), 24 is an MEA body, 25 is an insulating frame body, 26 is a manifold (on the hydrogen inlet side), 27 is a manifold (on the hydrogen outlet side), 28 is a manifold (on the refrigerant inlet side), 29 is a manifold (on the refrigerant outlet side), 30 is a manifold (on the air inlet side), 31 is a manifold (on the air outlet side), 32 is a pin, 33 is a manifold, 34 is an introduction hole, 43 is a rough sketch of the cross-sectional shape of the electrically conducting flow path part, 44 is a welding portion, 45 is a separator where the insulating outer circumferential part and the electrically conducting flow path part are integrated, 51 is an electrically conducting flow path part, 52 is an MEA, 53 is an insulating outer circumferential part, 61 is a transparent insulating part, 62 is an electrically conducting part, 71 is a black insulating frame body, 72 is a five-layer construction MEA, 81 is an insulating outer circumferential part, 82 is an electrically conducting flow path part, 83 is an MEA, 91 is a separator, 92 is an MEA,

101 is a cell terminal, 102 is a cross section of the flow path, 111 is an MEA, and 112 is an electrically conducting flow path part.

BEST MODE FOR CARRYING OUT THE INVENTION

The present invention is described in detail below by referring to the drawings. In the following, unless otherwise indicated, "%" showing a quantitative ratio is on the mass basis.

(Separator for Fuel Cell)

The separator for a fuel cell of the present invention has an electrically conducting flow path part which comprises an electrically conducting resin composition comprising a carbonaceous material (A) and a thermoplastic resin composition (B) and has a corrugated shape.

(Shape of Electrically Conducting Flow Path Part)

The corrugated shape indicates a structure having a recess 9 and a projection 8, where, as shown in FIG. 1, grooves on the front and back surfaces, each constituting a gas flow path, are alternately arrayed abreast in a plane. As for the corrugated separator, a metal-made separator is already known.

A conventional electrically conducting resin composition readily causes breakage due to high brittleness or makes it difficult to reduce the thickness due to low flowability, and a corrugated separator can be hardly produced therefrom. In the present invention, an electrically conducting thermoplastic resin composition enabling formation of a sheet in 0.5 mm or less and means for formation into a sheet have been found, and it has become possible to mold a separator at a high speed comparable to the speed in the press molding of a metal by using a stamp-molding method.

Only a flow path in a limited shape can be formed by the press molding of a metal, but in the present invention, the sheet is melted, so that a groove or flow path pattern in various shapes can be formed. By virtue of employing the stamp-molding method of the present invention, production of a separator with a small thickness and less fluctuation in the thickness at a low cost has been enabled.

Also, according to the present invention, the corrugated flow path is constructed from an electrically conducting resin composition, so that a lightweight and compact fuel cell can be fabricated. Furthermore, in the separator for a fuel cell, the outer circumference of the electrically conducting flow path part is covered with a lightweight insulating resin composition, so that a lightweight and packingless stack can be fabricated. In other words, although a packing is used in a normal separator for preventing gas leakage, a gas seal can be formed by welding without a packing in the present invention, so that the number of parts can be decreased and the weight can be more reduced.

The term "welding" as used in the present invention means that at least one member out of two bodies to be joined is melted by heat and these two bodies are thereby integrated. More specifically, even when only one member to be joined is melted and another is not melted, it may suffice if two members are integrated to an extent not causing separation unless an external force is applied. The welding also includes such a case that two members are put into a partially joined state by spot-applying heat and can hold the integrated state unless an external force is applied. A jointed state brought about by an anchor effect that the surface of one member in contact is melted and the melted material intrudes into irregularities or holes on the surface of another member may be also included. Incidentally, the portions required to form a gas seal need to be completely contacted and put into a state of causing no gas leakage. A joined state where contact surfaces of two bodies are melted to completely eliminate interface is preferred. In the present invention, even when the interface is not completely eliminated by welding, it may suffice if the gas seal is maintained.

(Suitable Corrugated Shape)

The cross-sectional shape may be preferably such a shape that the right back of a recess on the first main plane forms a projection on the second main plane and the bottom of a recess on the second main plane comes to a height between the top of a projection and the bottom of a recess on the first main plane, because the separator can be made thin. In other words, the shape shown in FIG. 29(*a*) described later may be more preferred than the shape shown in FIG. 29(*b*).

In the cross-sectional shape, the flow path site where the back surface of a recess on the first main plane forms a projection on the second main plane and the back surface of a projection on the first main plane forms a recess on the second main plane may preferably occupy 30% or more of the plane area (projected area from right above the separator), because the volume output density can be enhanced.

The width of the recess (groove) may be preferably from 0.1 to 3 mm. If the width is less than 0.1 mm, the pressure loss of gas or refrigerant tends to increase, whereas if the width exceeds 3 mm, unless the groove is deepened by increasing the thickness of the separator, an MEA tends to readily invade the groove when the MEA is stacked.

The width of the projection may be preferably from 0.3 to 5 mm. If the width is less than 0.3 mm, the contact area between an MEA and the separator tends to be reduced to cause heat generation, whereas if the width exceeds 5 mm, the gas diffusibility tends to be worsened.

The depth of the recess may be preferably from 0.2 to 1 mm. If the depth is less than 0.2 mm, the pressure loss of gas tends to increase, whereas if the depth exceeds 1 mm, the separator becomes thick and this may be not preferred.

The recess width/recess depth ratio may be preferably from 0.3 to 2.5. If the ratio is less than 0.3, the processability tends to be worsened, whereas if the ratio exceeds 2.5, an MEA tends to invade the groove when the MEA is stacked.

The width of the recess and projection was measured at the center in the depth direction of a groove (recess).

The groove on the first main plane and the groove on the second main plane may be the same or different in the dimension. The relative ratio in the width between the recess and the projection on the same main plane may be preferably from 0.1 to 4. If the relative ratio is less than 0.1, the contact resistance tends to increase, whereas if it exceeds 4, the gas diffusibility tends to worsen.

(Representative Embodiment of Separator)

Figure 2:
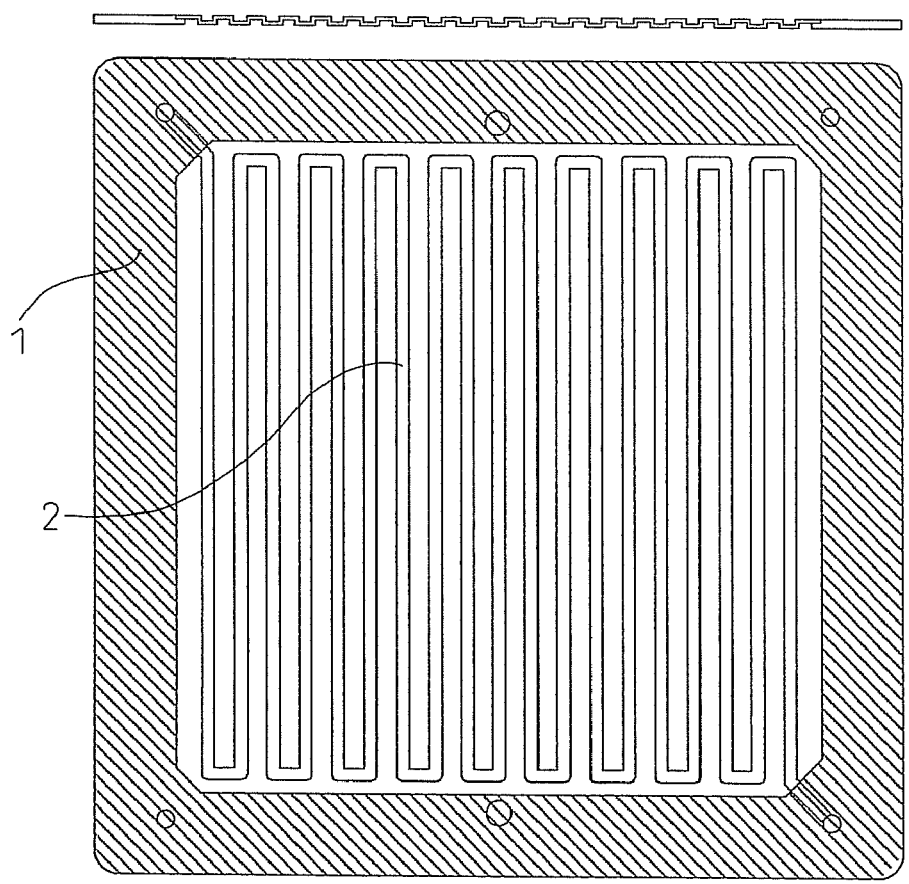
FIG. 2 is a schematic view (cross-sectional view and plan view) showing one example of the separator for a fuel cell of the present invention having a corrugated electrically conducting flow path part and an insulating outer circumferential part.
Figure 3:
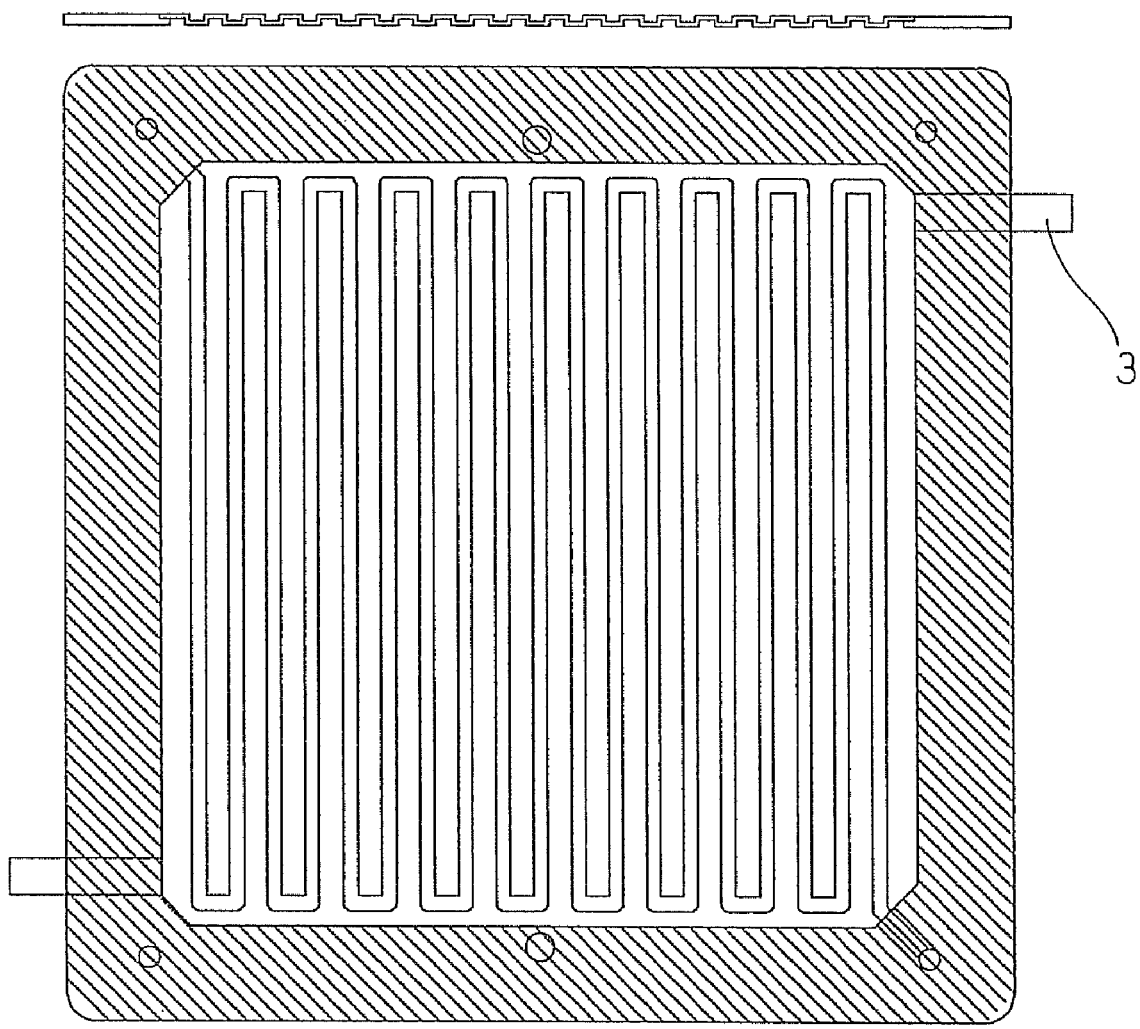
FIG. 3 is a schematic view of the separator for a fuel cell of the present invention having a terminal for measuring the cell voltage.

FIG. 2 shows a representative embodiment of the separator of the present invention. In order to perform the cell control or maintenance monitoring of a fuel cell, the separator may be preferably a separator shown in FIG. 3 where a terminal 3 for measuring the cell voltage is protruded from the electrically conducting flow path part 2 to the outside of the insulating outer circumferential part 1.

Figure 4:
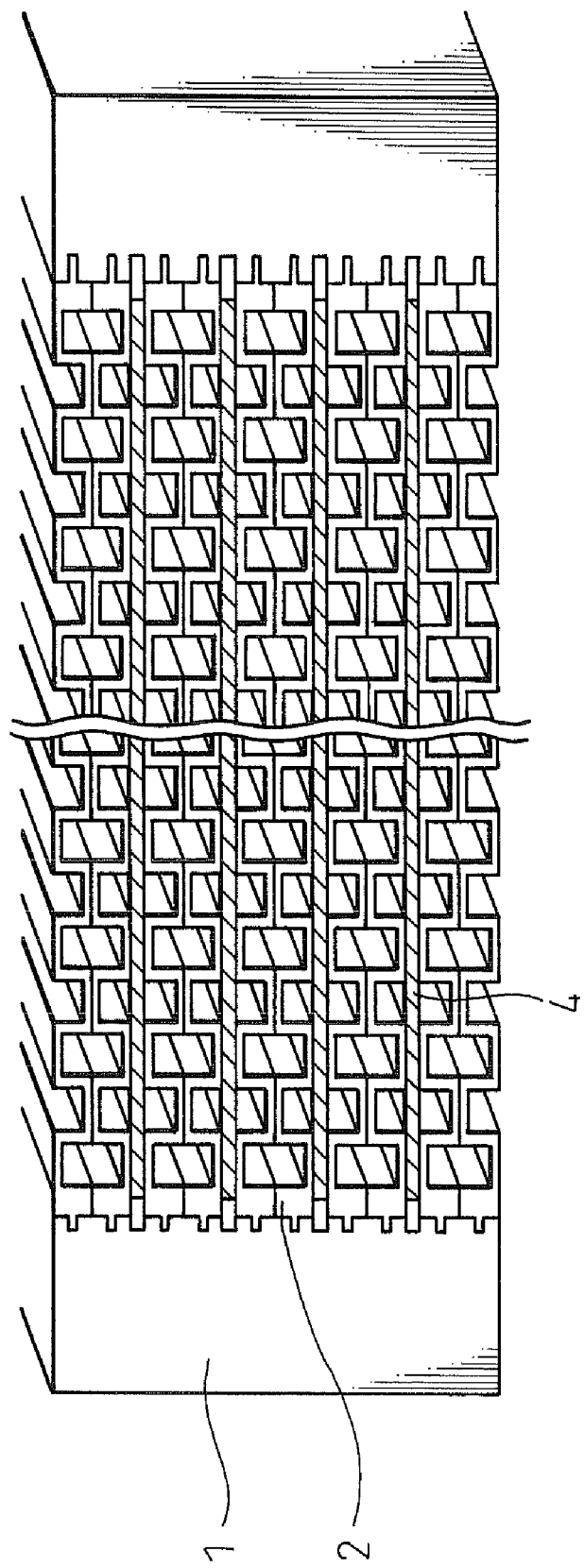
FIG. 4 is a schematic cross-sectional view showing one example of the stacking configuration using the separator of the present invention.

For more shortening the fabrication time of a fuel cell, the separator and an MEA (membrane electrode assembly) 4 may be preferably stacked into a completely integrated cell unit structure. The cell unit indicates a cell module having a structure, for example, shown in FIG. 4, where single cells of a fuel cell are stacked and one or more cells are integrally assembled.

(MEA)

Figure 5:
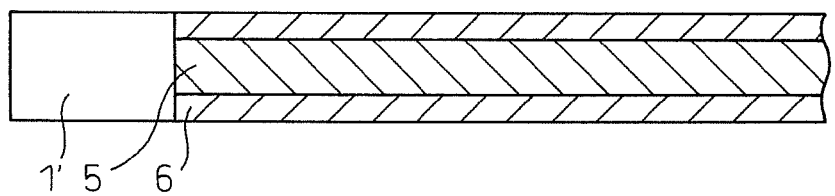
FIG. 5 is a partially enlarged view showing one example of the MEA used in FIG. 4.

FIG. 5 shows the partial enlarged view of the MEA, and the MEA used here may be preferably obtained, for example, by joining a catalyst layer to both surfaces of a solid polymer electrolyte membrane 5, further sandwiching both surfaces of the catalyst layers with a carbon paper or the like which works out to a gas diffusing layer 6, thereby forming a five-layer structure, and covering its outer circumference with an insulating thermoplastic resin composition, but the present invention is not limited thereto. When the outer circumferential part 1' of the MEA is formed of an insulating thermoplastic resin composition, the integration and gas seal can be achieved by heat welding, as a result, a cell module capable of more shortening the fabrication time can be obtained.

(Density of Electrically Conducting Flow Path Part)

The density of the electrically conducting flow path part for use in the present invention may be preferably from 1.2 to 2.5 g/cm$^3$, more preferably from 1.4 to 2.4 g/cm$^3$, still more preferably from 1.6 to 2.3 g/cm$^3$. If the density exceeds 2.5 g/cm$^3$, the weight tends to increase, whereas if it is less than 1.2 g/cm$^3$, the blending amount of the carbonaceous material for imparting electrical conductivity may be substantially decreased and only a separator with low electrical conductivity tends to be obtained.

(Thickness of Electrically Conducting Flow Path Part)

The thickness of the electrically conducting flow path part for use in the present invention (the minimum distance allowing for penetration into the flow path part on the back surface from an arbitrary point of the flow path part on the front surface) may be from 0.05 to 0.5 mm, preferably from 0.05 to 0.4 mm, more preferably from 0.05 to 0.3 mm. If the thickness is less than 0.05 mm, gas leakage may readily occur, whereas if it exceeds 0.5 mm, the weight of the separator may increase.

(Thickness Ratio of Electrically Conducting Flow Path Part)

The maximum thickness of the electrically conducting flow path part may be from 1 to 3 times, preferably from 1 to 2 times, more preferably from 1 to 1.5 times, the minimum thickness. If the flow path has an uneven thickness exceeding 3 times, the high-speed shaping of the flow path may become flow-molding, as a result, in the molding of a thin separator, there may arise a problem such as generation of density unevenness or remaining residual stress.

(Shape of Electrically Conducting Flow Path Part)

Figure 6:
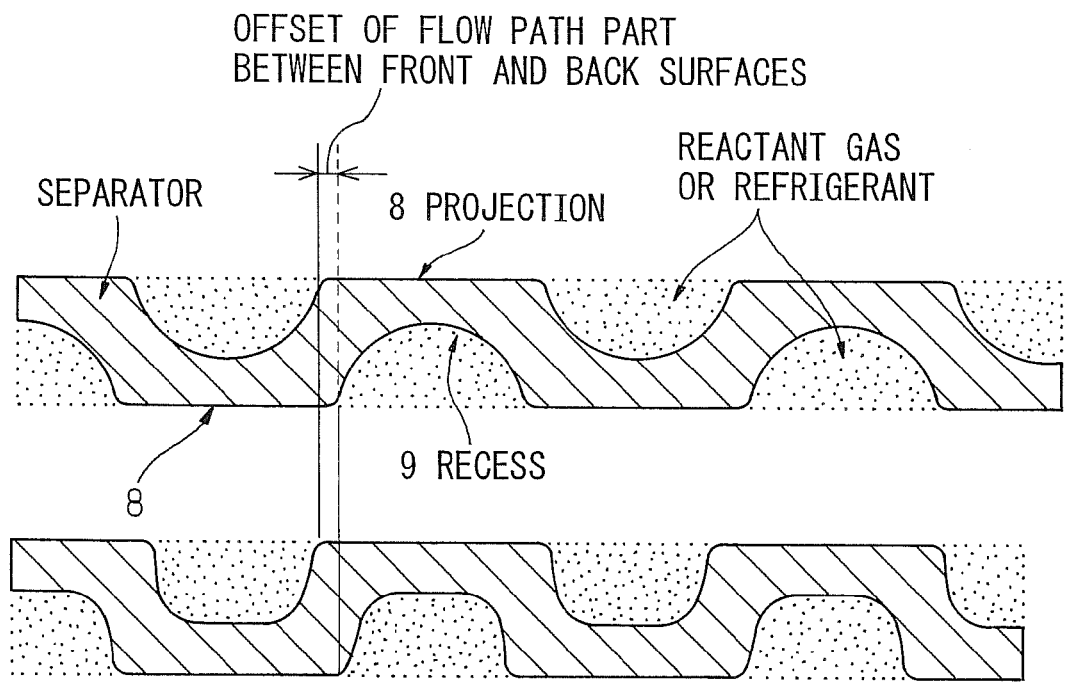
FIG. 6 is a schematic cross-sectional view showing one example of the electrically conducting flow path part having an offset of the present invention.

As for the cross-sectional shape of the flow path part, the bottom of the recess 9 may be made flat, but as shown in FIG. 6, when the bottom of the recess 9 is shaped to have a curve with a radius of 0.05 mm or more, discharge of produced water may be facilitated and this may be preferred. If the radius of the curve is less than 0.05 mm, the effect of facilitating the discharge of water may decrease.

In the cross-sectional shape of the flow path part, the projection 8 may have a flat surface and therefore, the contact resistance with an MEA can be decreased. In the case of a projection having a circular or elliptical shape, the contact area with an MEA may become small.

(Offset)

For the purpose of preventing the flow path part from cracking, collapsing and creeping, an offset shown in FIG. 6 (in other words, an overlapped portion between front and back projections) may be preferably provided such that flat surfaces of the projections 8 in the cross-sectional shape of the flow path part overlap by from 0.05 to 0.5 mm between front and back surfaces. The offset may be more preferably from 0.08 to 0.4 mm, still more preferably from 0.1 to 0.3 mm. If the offset is less than 0.05 mm, the flow path may be readily deformed due to expansion or shrinkage of the MEA, whereas if it exceeds 0.5 mm, the distance between flow paths may increase and the diffusion of gas may worsen.

(Component Having Low Glass Transition Temperature)

The electrically conducting resin composition constituting the separator of the present invention may preferably contain a component having a glass transition temperature of −20° C. or less. The glass transition temperature may be more preferably −30° C. or less, still more preferably −40° C. or less. If the glass transition temperature exceeds −20° C., the separator may worsen in the low-temperature property and may be cracked in a cold region or in a vigorously vibrating environment.

The method for measuring the glass transition temperature (hereinafter simply referred to as "Tg") of the electrically conducting flow path part in the separator of the present invention is not particularly limited. Examples thereof include a method of measuring the heating value by a differential scanning calorimeter and determining the Tg, a method of measuring the thermal expansion value in the thickness direction by a thermal analyzer and determining the Tg, and a method of measuring the dynamic viscoelasticity and loss tangent of a specimen by a viscoelasticity measuring apparatus and determining the Tg from the peak temperature of the loss tangent. In the present invention, the Tg was determined from the peak of the loss tangent by using a dynamic viscoelasticity measuring apparatus (Bohlin C-VOR, manufactured by Malvern Instruments). More specifically, as for the measurement conditions, the conditions for entering a region of linear viscoelasticity at a frequency of 0.001 to 1 Hz and a strain of 0.01 to 1% in a torsion mode were determined, and the measurement was performed by the strain control at a temperature rising rate of 5° C./min in the range from −100 to 100° C. In the measurement, a specimen having a thickness of 1 to 2 mm, a width of 10 mm and a length of 32 to 36 mm was used.

(Contact Resistance of Electrically Conducting Flow Path Part)

In the separator of the present invention, the electrically conducting flow path part comprising an electrically conducting resin composition may preferably have a contact resistance with the gas diffusing layer of 30 mΩcm$^2$ or less, more preferably 25 mΩcm$^2$ or less, still more preferably 20 mΩcm$^2$ or less, under the pressure condition of 2 MPa. If the contact resistance exceeds 30 mΩcm$^2$, the voltage may greatly drop to incur reduction in output.

Figure 7:
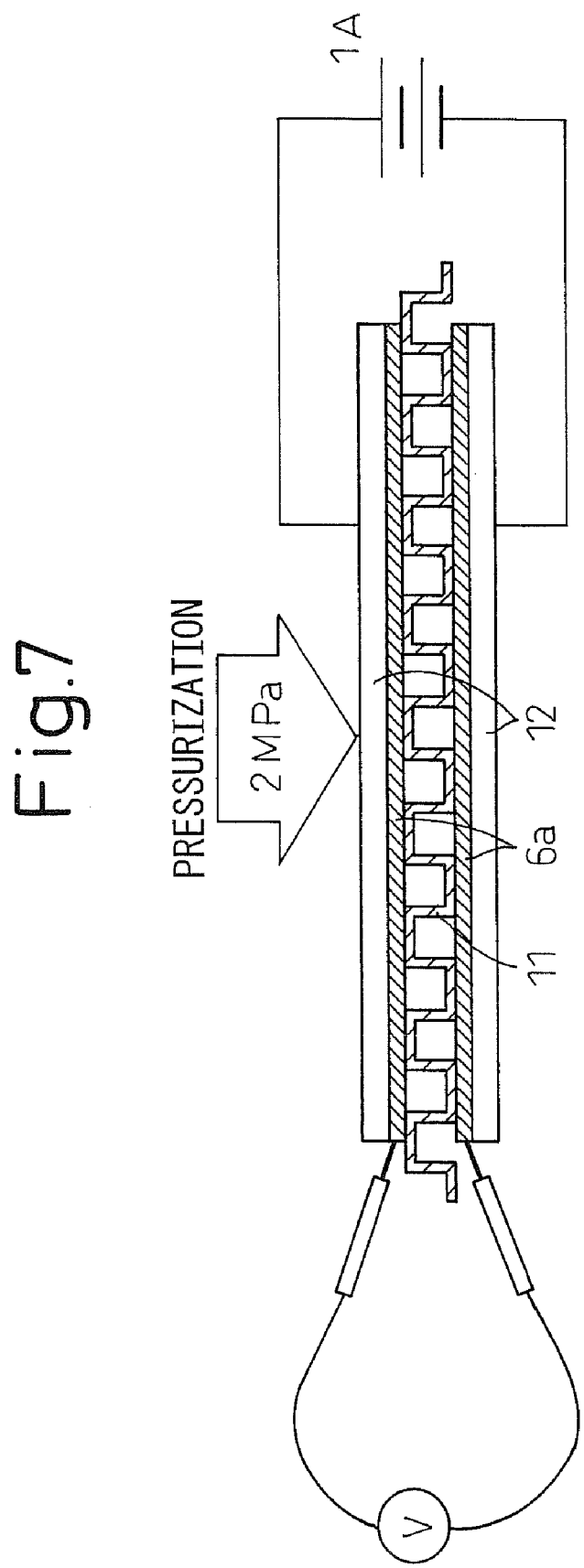
FIG. 7 is a schematic view for explaining the contact resistance measuring method used in the present invention.

FIG. 7 is a schematic view showing the contact resistance measuring method. A specimen 11 was sandwiched by two carbon papers (TGP-H-060, produced by Toray Industries, Inc.) 6a, these were further sandwiched by two gold-plated brass plates 12, a pressure of 2 MPa was uniformly applied thereto, a constant current of 1 A was passed in the penetration direction between gold-plated brass plates 12, the voltage between carbon papers was measured, and the contact resistance was calculated according to formula (1). The area of each of the carbon paper 6a and gold-plated brass plate 12 can be arbitrarily set according to the size of the separator, but in the present invention, the contact resistance was measured with an electrode area of 20 mm square.

$$Rc=(V/I)\times(S/2) \qquad (1)$$

wherein Rc is the contact resistance (mΩcm$^2$), V is the voltage (mV), I is the current (A), S is the contact effective area (cm$^2$) on one surface between the separator 11 and the carbon paper (gas diffusing layer) 6a.

(Enhancement of Weldability)

In the present invention, for integrating the electrically conducting flow path part and the insulating outer circumferential part, the welding may be preferably enhanced by incorporating at least one same polymer into both of these parts, incorporating a compatibilizer into at least one part, or forming these two parts as a combination for producing a pair of polymers having miscibility or compatibility. Also as regards the insulating outer circumferential part 1' of the MEA and the insulating outer circumferential part of the separator in the structure shown in FIG. 5 which is employed in the present invention, the welding may be preferably enhanced by incorporating at least one same polymer into both of these parts, incorporating a compatibilizer into at least one part, or forming these two parts as a combination containing respective components working out to a pair of polymers having miscibility or compatibility.

The miscibility means that the polymers have a capability of forming a single phase as a result of their melting and mixing. The thermodynamic requirement may be that the Gibbs free energy of mixing $\Delta G$ is less than zero ($\Delta G<0$), and whether a single phase or not can be confirmed by a scattering method (e.g., light scattering, X-ray scattering, neutron scattering) (see, *Polymer ABC Handbook*, compiled by Kobunshi ABC Kenkyu Kai, the Society of Polymer Science, Japan, page 4 and page 196, and D. R. Paul, *Encycl. Polym. Sci. Eng.*, Vol. 12, page 399, John Wiley & Sons (1988)). Examples of the combination having miscibility include polypropylene/polypropylene (a combination differing in the molecular weight, molecular weight distribution or the like), high-density polyethylene/high-density polyethylene (a combination differing in the molecular weight, molecular weight distribution or the like), polyphenylene ether/polystyrene, polypropylene/polybutene-1, and polymethyl methacrylate/polyvinyl acetate.

The compatibility means that the polymers are non-miscible, but have some ability of effecting interfacial bonding between the polymers. Examples of the combination having compatibility include the followings:

1) A combination having a molecular chain with the same segmental structure in the polymer. For example, polymers cannot be mixed in the form of a polymer A and a polymer B but when an A-B graft copolymer, block copolymer or random copolymer is formed, the polymer can be compatibilized with both the polymer A and the polymer B and partially effect molecular intertwining. Accordingly, the combination may be a combination such as polymer A/A-B copolymer, and polymer B/A-B copolymer. Furthermore, a combination of a mixture of polymer A and A-B copolymer/a mixture of polymer B and A-B copolymer, in which the A-B copolymer works as the compatibilizer, may also be employed. Specific examples of the combination in this class include polypropylene/styrene ethylene butylene styrene copolymer and polypropylene/ethylene propylene rubber.

2) A combination with the difference in the solubility parameter being less than 1.0 (as regards the method for calculating the solubility parameter of a polymer, see, for example, *SP Chi Kiso•Oyo to Keisan Houhou (Basis•Application and Calculation Method of SP Value)*, Chapters 5 and 6, Joho Kiko Shuppan K.K. (March, 2005)). When the difference in the solubility parameter is small, the polymers are close in the cohesion energy density and can be well mixed. Examples of this combination include butadiene-acrylonitrile rubber (NBR)/polyvinyl chloride (PVC). The solubility parameter of NBR is 9.4, the solubility parameter of PVC is 9.5, and these are very close. In addition, polypropylene/hydrogenated styrene butadiene rubber is also included in this class.

3) A combination exhibiting a strong interaction between polymers, in other words, a combination having an intermolecular interaction such as van der Waals' force, dipole/dipole force, hydrogen bonding, charge transfer force, ion/ion interaction, acid/base force and covalent bonding. Examples of this combination include maleic anhydride-modified polyethylene/polyamide, polyvinyl chloride/chlorinated polyethylene, liquid crystal polymer/polybutylene phthalate, and polycarbonate/acrylonitrile butadiene styrene copolymer.

The compatibilizer is a polymer which works as a surfactant for polymers A and B incapable of being mixed and decreases the free energy at the interface. Accordingly, a polymer having miscibility and compatibility also has a function as a compatibilizer.

In the present invention, it may be preferred that both the separator and the MEA frame body part contain at least one same polymer, at least one member contains a compatibilizer, or these members are a combination containing respective components working out to a pair of polymers having miscibility or compatibility.

(Adhesive Functional Group)

For the purpose of enhancing the weldability at the interface, a component having a functional group capable of adhering to each member through a chemical reaction may be incorporated, if desired. Examples of this adhesive functional group include, but are not limited to, a polymer or monomer having a hydroxyl group, a carboxyl group, an amino group, an epoxy group, an isocyanate group, a glycidyl methacrylate group, a carbonyl group, an acryl group, a maleic anhydride group, a silyl group or an amine-based functional group. By virtue of containing such a component, interface strengthening means is applied and interfacial delamination due to heat history can be more effectively suppressed.

(Melting Point of Outer Layer)

For the purpose of more reducing the contact resistance between the gas diffusing layer and the separator, in at least either one of the electrically conducting flow path part and the insulating outer circumferential part, the melting point of the outer layer on at least one surface out of front and back surfaces may be preferably made to be lower than the melting point of the center layer. The melting point of the outer layer is preferably lower than the melting point of the center layer by 10° C. or more, or more preferably by 20° C. or more. If the melting point of the outer layer is higher than the melting point of the center layer, the weld strength may decrease. In the case of welding the outer layer to the gas diffusing layer, heating is performed at a temperature between the melting point of the outer layer and the melting point of the center layer. The melting point of the outer layer is preferably 100° C. or more, more preferably 120° C. or more. If the melting point of the outer layer is less than 100° C., the performance of the fuel cell may degrade. The thickness of the outer layer may be from 0.1 to 0.001 mm, more preferably from 0.05 to 0.001 mm. If the thickness of the outer layer exceeds 0.1 mm, the flow path may be readily deformed, however, if it is less than 0.001 mm, the weld strength may not be enhanced. Examples of such a construction include a three-layer structure where an outer layer is disposed on both sides of a center layer, but as long as the melting point of the outer layer welded to the gas diffusing layer is lower than the melting point of the center layer, the construction is not limited to a three-layer structure and may comprise four or more layers. In the case of contacting the gas diffusing layer only at one surface, a two-layer construction where the melting point of only the outer layer on one surface is made lower than the melting point of the center layer may also be employed.

The melting point measuring method for use in the present invention is not particularly limited, but the melting point may be measured, for example, by the DSC method described in JIS K7121. In the present invention, the melting point was measured by DSC-7 manufactured by Perkin-Elmer.

Similarly to the means for enhancing the weldability between the electrically conducting flow path part and the insulating outer circumferential part, in order to enhance the weldability between the outer layer and the center layer, the interfacial strength and adhesion may be preferably enhanced by incorporating at least one same polymer into both of these layers, incorporating a compatibilizer into at least one layer, or forming these two layers as a combination containing respective components working out to a pair of polymers having miscibility or compatibility. Furthermore, for the purpose of enhancing the strength at the interface, a component having a functional group capable of adhering through a chemical reaction may be incorporated into each layer, if desired.

(Insulating Outer Circumferential Part)

The insulating outer circumferential part for use in the present invention may have a volume resistivity of $10^{10}$ Ωcm or more, more preferably $10^{11}$ Ωcm or more, still more preferably $10^{12}$ Ωcm or more. If the volume resistivity is less than $10^{10}$ Ωcm, shortcircuit may occur between cells. The volume resistivity was measured according to JIS K6911 by using Hiresta UP Model MCP-HT450 manufactured by Dia Instruments Co., Ltd.

Furthermore, regarding the insulating outer circumferential part, for the purpose of increasing the adhesion at the stacking and enhancing the impact property, flexibility may be preferably imparted by setting the flexural modulus of the insulating outer circumferential part to be from 4/5 to 1/200 times, more preferably from 3/5 to 1/150 times, still more preferably from 1/2 to 1/100 times, the flexural modulus of the electrically conducting flow path part. If the flexural modulus of the insulating outer circumferential part exceeds 4/5 times, the adhesion at the stacking may be worsened and welding failure or gas leakage tends to be readily brought about, whereas if it is less than 1/200 times, the pressure on clamping after stacking may be concentrated in the electrically conducting flow path part and this may bring a risk of damaging the flow path.

Also, in order to not cause a defect due to heat, the average linear expansion coefficient of the insulating outer circumferential part may be preferably from 1/7 to 7 times, more preferably from 1/6 to 6 times, still more preferably from 1/5 to 5 times, the average linear expansion coefficient of the electrically conducting flow path part. If the average linear expansion coefficient is less than 1/7 times or exceeds 7 times, interfacial delamination or deformation may be caused due to heat history.

In the present invention, the method for measuring the average linear expansion coefficient is not particularly limited, but for example, the average linear expansion coefficient can be measured according to JIS K7197 by a thermal mechanical analyzer (TMA). The average linear expansion coefficient at a temperature of 20 to 100° C. was measured here using a thermal mechanical analyzer, EXSTAR6100 TMA/SS (manufactured by Seiko Instruments Inc.).

(Ratio of Component (A) to Component (B))

As for the ratio of the component (A) to the component (B) in the electrically conducting resin composition for use in the present invention, the mass ratio of the component (A) to the component (B) (referred to as (A)/(B)) may be from 1 to 20, preferably from 1.5 to 20, more preferably from 2 to 20. If the mass ratio (A)/(B) is less than 1, insufficient electrical conductivity tends to result, whereas if the mass ratio A/B exceeds 20, the processability tends to deteriorate.

(Component (A))

The component (A) which is a carbonaceous material for use in the present invention includes one species or a combination of two or more species selected from carbon black, carbon fiber, amorphous carbon, expanded graphite, artificial graphite, natural graphite, kish graphite, vapor grown carbon fiber, carbon nanotube and fullerene.

Examples of the carbon black as one of the carbonaceous materials above include ketjen black and acetylene black, obtained by incomplete combustion of natural gas or the like or by thermal decomposition of acetylene; furnace carbon obtained by incomplete combustion of hydrocarbon oil or natural gas; and thermal carbon obtained by thermal decomposition of natural gas.

The carbon fiber includes a pitch type prepared from heavy oil, by-product oil, coal tar and the like, and a PAN type prepared from polyacrylonitrile.

Examples of the method for obtaining the amorphous carbon include a method of curing a phenol resin and subjecting the cured product to firing and grinding into a powder, and a method of curing a phenol resin in a spherical amorphous powder state and firing the cured product. In order to obtain amorphous carbon having high electrical conductivity, a heat treatment at 2,000° C. or more may be suitably performed.

The expanded graphite powder is, for example, a powder obtained by dipping a graphite with a highly developed crystal structure, such as natural graphite or pyrolytic graphite, in a strongly oxidative solution, such as a mixed solution of concentrated sulfuric acid and nitric acid or a mixed solution of concentrated sulfuric acid and hydrogen peroxide water, to produce a graphite intercalation compound and after water washing, rapidly heating the compound, thereby expanding the graphite crystal in the C axis direction, or a powder obtained by once rolling the powder above into a sheet and grinding the sheet.

The kish graphite is a planarly crystallized carbon precipitated along the temperature drop of melted pig iron in the hot metal preliminary treatment or the like. The kish graphite is generated as a matter mixed in slug or iron oxide and therefore, a high-purity kish graphite is recovered by beneficiation and further ground to finish a powder in a size suitable for usage.

In order to obtain artificial graphite, a coke is usually first produced. As for the raw material of the coke, a petroleum-based pitch, a coal-based pitch or the like is used. Such a raw material is carbonized into a coke. Examples of the method for forming a graphite powder from the coke generally include a method of grinding and then graphitizing the coke, a method of graphitizing the coke itself and then grinding it, and a method of adding a binder to the coke, molding and firing the mixture, and subjecting the fired product (the coke and this fired product are collectively called a coke and the like) to graphitization and then grinding into a powder. In the raw material coke and the like, the crystal may be preferably not developed as much as possible and therefore, those heat-treated at 2,000° C. or less, preferably 1,200° C. or less, may be suitable.

Examples of the graphitization method which can be used include a method using an Acheson furnace where the powder is charged into a graphite crucible and a current is directly passed thereto, and a method of heating the powder by a graphite heating element.

(Boron)

In the carbonaceous material, from 0.05 to 5 mass % of boron may be preferably contained. If the boron amount is less than 0.05 mass %, the objective graphite powder having high electrical conductivity tends to be hardly obtained, whereas even if the boron is contained in excess of 5 mass %, this tends to scarcely contribute to enhancing the electrical conductivity of the carbon material. The method for measuring the amount of boron contained in the carbonaceous material is not particularly limited. In the present invention, a value measured by the inductively-coupled plasma emission spectrometry (hereinafter simply referred to as "ICP") or inductively-coupled plasma emission and mass spectrometry (hereinafter simply referred to as "ICP-MS") is used. More specifically, a sample after adding thereto sulfuric acid and nitric acid is decomposed under microwave heating (230° C.) (digester method) and further decomposed by adding perchloric acid ($HClO_4$), and the decomposition product is diluted with water and analyzed by an ICP emission analyzer to measure the amount of boron.

As for the method of incorporating boron, a boron source such as B simple element, $B_4C$, BN, $B_2O_3$ and $H_3BO_3$ is added to a simple substance such as coke, pitch, natural graphite, artificial graphite, kish graphite, expanded graphite, carbon black, carbon fiber, vapor grown carbon fiber and carbon nanotube, or a mixture of one or more species thereof and after thoroughly mixing, the obtained mixture is graphitized at about 2,300 to 3,200° C., whereby boron can be incorporated into the carbonaceous material. If the boron compound is non-uniformly mixed, not only a non-uniform graphite powder is obtained but also sintering occurs highly probably at the graphitization. In order to achieve uniform mixing of the boron compound, the boron source may be preferably formed into a powder having a particle diameter of 50 μm or less, preferably about 20 μm or less, and then mixed with the powder such as coke.

How the boron is contained is not particularly limited as long as boron and/or a boron compound is mixed in the graphite, but suitable examples thereof include a mode where boron is present between layers of the graphite crystal, and a mode where a part of carbon atoms constituting the graphite crystal are substituted by boron atom. In the case where a part of carbon atoms are substituted by boron atom, the bond between boron atom and carbon atom may be in any bonding form such as covalent bonding and ion bonding.

(Grinding)

In order to grind the coke, artificial graphite, natural graphite and the like, a high-speed rotary grinder (e.g., hammer mill, pin mill, cage mill), a ball mill of various types (e.g., rolling mill, vibrating mill, planetary mill), a stirring mill (e.g., bead mill, attritor, circulating tube-type mill, annular mill), or the like may be used. Furthermore, a screen mill, a turbo-mill, a supermicron mill or a jet mill, which are a pulverizer, may also be used by selecting the conditions. The coke, natural graphite or the like is ground using such a grinder and at this time, the average particle diameter and particle size distribution are controlled by selecting the grinding conditions and if desired, classifying the powder.

(Classification)

The classification of coke powder, artificial graphite powder, natural graphite powder and the like may be performed by any method as long as the particles can be separated, but for example, a sieve classification method or an air classifier such as forced vortex-type centrifugal classifier (e.g., micron separator, turbo-plex, turbo-classifier, superseparator) or inertial classifier (e.g., modified virtual impactor, elbow jet) may be used. A wet sedimentation or centrifugal classification method may also be used.

(Vapor Grown Carbon Fiber, Etc.)

The component (A) for use in the present invention may preferably contain a vapor grown carbon fiber and/or a carbon nanotube in an amount of 0.1 to 50 mass %, more preferably from 0.1 to 45 mass %, still more preferably from 0.2 to 40 mass %. If the content is less than 0.1 mass %, an effect of enhancing the electrical conductivity can be hardly obtained, whereas if it exceeds 50 mass %, moldability tends to be worsened.

Furthermore, the vapor grown carbon fiber or carbon nanotube may preferably contain boron in an amount of 0.05 to 5 mass %, more preferably from 0.06 to 4 mass %, still more preferably from 0.06 to 3 mass %. If the boron content is less than 0.05 mass %, the electrical conductivity-enhancing effect by the addition of boron is small, whereas if boron added in excess of 5 mass %, the impurity amount may increase and this tends to readily cause deterioration in other physical properties.

The vapor grown carbon fiber is a carbon fiber having a fiber length of about 0.5 to 10 μm and a fiber diameter of 200 nm or less, which is obtained, for example, by using, as a raw material, an organic compound such as benzene, toluene, natural gas and hydrocarbon-based gas, and performing a thermal decomposition reaction at 800 to 1,300° C. together with hydrogen gas in the presence of a transition metal catalyst such as ferrocene. The size of the fiber diameter may be preferably 160 nm or less, more preferably 120 nm or less. A size exceeding 200 nm may be not preferred because the effect of obtaining high electrical conductivity decreases. Furthermore, the fiber may be preferably then graphitized at about 2,300 to 3,200° C., more preferably graphitized together with a graphitization catalyst such as boron, boron carbide, beryllium, aluminum and silicon at about 2,300 to 3,200° C. in an inert gas atmosphere.

As for the carbon nanotube, not only its mechanical strength but also its field emission function and hydrogen storage function are recently taken notice of in industry, and its magnetic function also starts attracting attention. This type of carbon nanotube is also called graphite whisker, filamentous carbon, graphite fiber, extra-fine carbon tube, carbon tube, carbon fibril, carbon microtube, carbon nanofiber or the like and has a fiber diameter of about 0.5 to 100 nm. The carbon nanotube includes a single-layer carbon nanotube where the graphite film constituting the tube comprises a single layer, and a multilayer carbon nanotube where the graphite film comprises multiple layers. In the present invention, either a single-layer carbon nanotube or a multilayer carbon nanotube can be used, but a single-layer carbon nanotube may be preferred, because a composition having higher electrical conductivity and higher mechanical strength tends to be obtained.

The carbon nanotube may be obtained, for example, by producing a carbon nanotube by an arc discharge method, a laser evaporation method, a thermal decomposition method or the like described in Saito and Bando, *Carbon Nanotube no Kiso (Basis of Carbon Nanotube)*, pp. 23-57, Corona Publishing Co., Ltd. (1998), and further purifying it by a hydrothermal method, a centrifugal separation method, an ultrafiltration method, an oxidation method or the like so as to enhance the purity. In order to remove impurities, the carbon nanotube may be more preferably high-temperature treated in an inert gas atmosphere at about 2,300 to 3,200° C., still more preferably high-temperature treated in an inert gas atmosphere at about 2,300 to 3,200° C. together with a graphitization catalyst such as boron, boron carbide, beryllium, aluminum and silicon.

(Average Particle Diameter of Component (A))

In the present invention, the average particle diameter of the component (A) was measured by a laser diffraction scattering method (using an apparatus, Microtrack HRA, manufactured by Nikkiso Co., Ltd.). As for the measurement conditions, 50 mg of a sample was weighed and added to 50 ml of distilled water, 0.2 ml of an aqueous 2% Triton (surfactant, produced by Wako Pure Chemical Industries, Ltd.) solution was added thereto and after ultrasonic wave dispersion for 3 minutes, the number average particle diameter fiber was measured.

Also, in the measurement of the average fiber length of a carbonaceous fiber contained in the component A, 100 carbon fibers observed using SEM (JSM-5510, manufactured by JEOL Ltd.) were subjected to image analysis of the fiber length, whereby the number average fiber length was determined (the fiber as used herein indicates a fiber having a (length of long axis/length of short axis) ratio of 10 or more).

(Component (B))

In the present invention, the component (B) (thermoplastic resin composition) and the main component (a component accounting for 50 mass % or more) contained in the insulating thermoplastic resin composition of the insulating outer circumferential part include a thermoplastic resin comprising one species or a combination of a plurality of species selected from an acrylonitrile butadiene styrene copolymer, polystyrene, acrylic resin, polyvinyl chloride, polyimide, a liquid crystal polymer, polyether ether ketone, fluororesin, polyolefin, polyacetal, polyamide, polyethylene terephthalate, polybutylene terephthalate, polycarbonate, polycycloolefin, polyphenylene sulfide, polyethersulfone, polyphenylene oxide and polyphenylenesulfone.

Among these, the main component is preferably a thermoplastic resin comprising one species or a plurality of species selected from polyolefin, fluororesin, polybutylene terephthalate, polyphenylene sulfide, a liquid crystal polymer, polyether ether ketone, polycycloolefin and polyethersulfone each having a melting point of 100° C. or more and also from polycarbonate, polystyrene and polyphenylene oxide each having a glass transition temperature of 100° C. or more.

In particular, for the purpose of enhancing the hydrolysis resistance, it may be preferred to contain a crystalline hydrocarbon-based polymer having a melting point of 100° C. or more, more preferably 110° C. or more, still more preferably 120° C. or more. If the melting point is less than 100° C., the separator tends to creep.

The melting point is not particularly limited in its measurement but may be measured according to JIS K7121 by using a differential scanning calorimeter (DSC7) manufactured by Perkin-Elmer.

Specific examples of the crystalline hydrocarbon-based polymer include polypropylene, polyethylene, polybutene, polymethylpentene and syndiotactic polystyrene.

(Elastomer)

In the present invention, the separator can be made resistant to cracking by incorporating an elastomer into the component (B) in an amount of 0.05 to 30 mass %, preferably from 1 to 30 mass %, more preferably from 5 to 25 mass %. If the elastomer content is less than 0.05 mass %, the impact resistance may not be enhanced, whereas if it exceeds 30 mass %, insufficient rigidity may result and incur deformation of the flow path or worsening of the gas impermeability.

The elastomer for use in the present invention may be dispersed in the component (B) when the average particle diameter is 5 μm or less, and by making the average particle diameter of the elastomer smaller than the average particle diameter or the average fiber length of the component (A), electrical conductivity and toughness can be enhanced. The average particle diameter may be preferably 4 μm or less, more preferably 3 μm or less. If the average particle diameter exceeds 5 μm, the separator may be readily broken and also suffer from bad electrical conductivity.

The elastomer for use in the present invention is a polymer having rubbery elasticity in the vicinity of ordinary temperature. The elastomer which can be used is, for example, one species or a combination of two or more species selected from acrylonitrile butadiene rubber, hydrogenated nitrile rubber, styrene butadiene rubber, an ethylene-propylene copolymer, an ethylene-octene copolymer, an ethylene-butene copolymer, a propylene-butene copolymer, ethylene-propylene-diene terpolymerization rubber, ethylene butadiene rubber, fluororubber, isoprene rubber, silicone rubber, acrylic rubber, butadiene rubber, high styrene rubber, chloroprene rubber, urethane rubber, polyether-based special rubber, ethylene tetrafluoride/propylene rubber, epichlorohydrin rubber, norbornene rubber, butyl rubber, a styrene-based thermoplastic elastomer, an olefin-based thermoplastic elastomer, a urethane-based thermoplastic elastomer, a polyester-based thermoplastic elastomer, a polyamide-based thermoplastic elastomer, a 1,2-polybutadiene-based thermoplastic elastomer, a fluorine-based thermoplastic elastomer and soft acrylic resin.

Among these, preferred in view of hydrolysis resistance is one species or a combination of two or more species selected from hydrocarbon-based elastomers, in other words, styrene butadiene rubber, an ethylene-propylene copolymer, an ethylene-octene copolymer, an ethylene-butene copolymer, a propylene-butene copolymer, an ethylene-propylene-diene terpolymerization rubber, ethylene butadiene rubber, isoprene rubber, butadiene rubber, a styrene-based thermoplastic elastomer, an olefin-based thermoplastic elastomer and a 1,2-polybutadiene-based thermoplastic elastomer.

Specific examples of the styrene-based thermoplastic elastomer include hydrogenated styrene butadiene rubber, a styrene ethylene-butylene styrene block copolymer, a styrene ethylene-propylene styrene block copolymer, an olefin crystal ethylene-butylene olefin crystal block copolymer, a styrene ethylene-butylene olefin crystal block copolymer, a styrene isoprene styrene block copolymer, and a styrene butadiene styrene block copolymer. Among these, preferred are hydrogenated styrene butadiene rubber, a styrene ethylene-butylene styrene block copolymer and a styrene ethylene-propylene styrene block copolymer.

The number average particle diameter of the elastomer component dispersed in the component (B) was determined from 100 particles by preparing an ultrathin slice from the cross section of a liquid nitrogen-frozen sample by means of an ultramicrotome (ULTRACUT N, manufactured by Reichert Inc.), dyeing it with osmium, observing the particle diameter of the dispersion phase through TEM (JEM-1230, manufactured by JEOL Ltd.), and analyzing the TEM image by an image analyzing system (Luzex, manufactured by Nireco Corp.).

(Additive)

In the thermoplastic resin composition which is the component (B) of the present invention, one or more members of an antioxidant, a halogen scavenger, an ultraviolet absorbent and the like may be previously added, if desired, in the range giving a total amount of 0.01 to 5 parts by weight per 100 parts by weight of the component (B). Furthermore, in the electrically conducting resin composition of the present invention, an additive comprising one species or a combination of two or more species selected from an antioxidant, an ultraviolet absorbent, a lubricant, a reinforcing material (e.g., glass fiber, whisker, organic fiber, carbon fiber), a flame retardant, a surfactant and a surface modifier (e.g., hydrophilicity-imparting agent, water repellency-imparting agent, slidability-imparting agent), may be incorporated in a total amount of 0.01 to 20 mass % for the purpose of improving the hardness, strength, electrical conductivity, moldability, durability, weather resistance, water resistance, surface property and the like. Also, in the thermoplastic resin composition which is a component of the insulating outer circumferential part, an additive comprising one species or a combination of two or more species selected from an elastomer, a rubber, an antioxidant, an ultraviolet absorbent, a halogen scavenger, a lubricant, a reinforcing material (e.g., glass fiber, whisker, organic fiber, carbon fiber), a filler, a flame retardant, a surfactant, a plasticizer and a surface modifier (e.g., hydrophilicity-imparting agent, water repellency-imparting agent, slidability-imparting agent), may be incorporated in a total amount of 0.01 to 80 mass % for the purpose of improving the flexibility, adhesion, thermal shrinkage, linear expansion coefficient, insulating property, durability, moldability, strength, modulus, surface property and the like.

(Production Process of Resin Composition)

The electrically conducting resin composition and insulating resin composition for use in the present invention are not particularly limited in their production process, but for example, in the production process of the electrically conducting resin composition or insulating resin composition, respective components described above may be preferably mixed as uniformly as possible by using a kneader generally used in the field of resin, such as roll mill, extruder, kneader and Banbury mixer.

The electrically conducting resin composition and insulating resin composition for use in the present invention may be, after kneading or mixing, ground or granulated for the purpose of facilitating the supply of the material to the molding machine or mold. For the grinding, a homogenizer, a Wiley grinder, a high-speed rotary grinder (e.g., hammer mill, pin mill, cage mill, blender) or the like may be used, and the grinding may be preferably performed while cooling so as to prevent the material from aggregating with each other. The granulation includes a method of pelletizing the material by using an extruder, a Ruder, a co-kneader or the like, and a method using a pan-type granulator or the like.

(Separator)

For producing the separator of the present invention, an electrically conducting resin composition comprising a carbonaceous material and a thermoplastic resin composition is formed into a sheet, and the sheet is heated to the melting temperature, inserted into a mold set to not more than the solidification temperature of the sheet, and then subjected to stamp-molding, whereby an electrically conducting flow path part is obtained.

(Sheet)

The thickness of the sheet suitable for high-speed molding may be preferably from 0.05 to 2 mm, more preferably from 0.1 to 1.5 mm, still more preferably from 0.1 to 1.0 mm. If the thickness is less than 0.05 mm, the electrically conducting flow path part may be readily broken, whereas if it exceeds 2 mm, the yield may decrease.

As for the shape of the sheet, a continuous sheet or a sheet cut into an appropriate size is fed to the mold. The sheet is heated in the preceding step. The heating of the sheet is not limited in its method, but may be performed, for example, by one or more methods selected from infrared heating, induction heating, warm air heating, hot plate heating and microwave heating. For performing the heating at a high speed, infrared heating and induction heating may be preferred. More preferably, the sheet heated may be fed directly to the mold from the extrusion molding machine.

The processing method of the sheet is selected from a method by an extruder, a method by a combination of an extruder and a mill roll, and a method of feeding a powdery material to the roll. The temperature of the mill roll may be preferably set to not more than the solidification temperature of the sheet.

Also, the performance or accuracy of the separator can be more enhanced by forming the sheet in a multilayer structure comprising two or more layers. In particular, when natural graphite is incorporated into the surface layer of the sheet, flowability and in turn accuracy may be enhanced. Furthermore, when the modulus of the surface layer is set to ½ or less in terms of the ratio to the modulus of the center layer (modulus of surface layer/modulus of center layer), the adhesion on stacking may be enhanced to reduce the contact resistance and therefore, the output density may increase. The modulus may be more preferably ⅓ or less, still more preferably ⅕ or less. If the modulus exceeds ½, the contact resistance when stacked tends to worsen. As for the modulus, the flexural modulus was measured according to JIS K7171 under the conditions of a specimen of 40×10×2 mm, a test speed of 1 mm/min and a support-to-support distance of 30 mm.

(Processing of Sheet)

In the stamping step, the time after the sheet heated to the melting temperature is fed to the mold until the pressure intensification is completed by closing the mold may be preferably 10 seconds or less, more preferably 5 seconds or less, still more preferably 3 seconds or less. If the time exceeds 10 seconds, the heated sheet may be solidified. The stamp-molding is performed by holding the pressure for 5 seconds or less, and the molded article is taken out from the mold to obtain a corrugated electrically conducting flow path part shown in FIG. 1.

Figure 8:
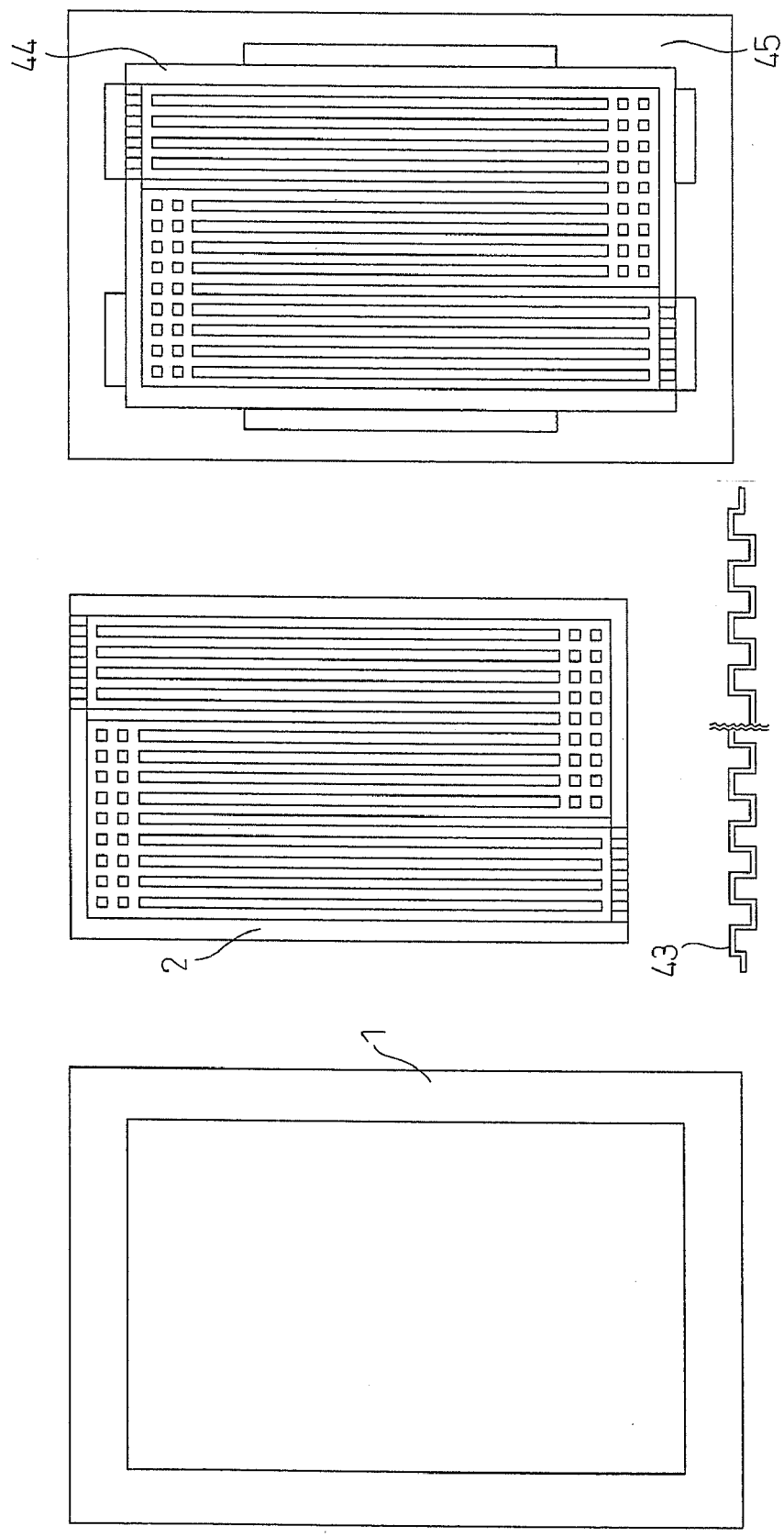
FIG. 8 is a view showing one example of the construction of the separator for a fuel cell of the present invention.

The separator may be produced by any one method selected from a method of inserting the corrugated electrically conducting flow path part obtained as above into a mold and then injection molding an insulating outer circumferential part, thereby integrating these parts; a method of forming an electrically conducting resin composition comprising a carbonaceous material and a thermoplastic resin composition into a sheet, heating the sheet to the melting temperature, inserting it into a mold set to not more than the solidification temperature of the sheet, stamp-molding the sheet, and injection molding an insulating resin composition working out to a frame body while keeping the mold closed; a method of separately molding a frame body part (frame body part composed of an insulating resin composition) corresponding to the insulating outer circumferential part 1 shown in FIG. 8 and a corrugated electrically conducting flow path part 2 (flow path part composed of an electrically conducting resin composition), and integrating these parts by heat-welding their boundary surfaces by means of an energy source selected from an ultrasonic wave, a laser, a high-frequency wave, an infrared ray and an electricity; and a method of charging an electrically conducting resin composition sheet comprising a carbonaceous material and a thermoplastic resin composition and an insulating sheet working out to the insulating outer circumferential part, each in a melted state, into a mold, or heating the sheets to the melted state after charging them into the mold, and then performing shaping and welding at the same time by a cold pressing machine. The frame body part corresponding to the insulating outer circumferential part 1 shown in FIG. 8 can be formed by injection molding, extrusion molding, press molding or the like.

The mold temperature may be preferably set to not more than the solidification temperature of the material and for more enhancing the transferability or accuracy, may be preferably controlled by a system capable of elevating or lowering the temperature.

(Welding Method)

As for the welding method of the insulting outer circumferential part 1 and the electrically conducting flow path part 2 of FIG. 8, an ultrasonic wave, a laser and a high-frequency wave may be preferably used, because welding can be topically performed and deformation of the separator can be avoided. In the case of using an ultrasonic wave, welding can be performed by contacting an ultrasonic horn in a pressure-applied state with the welding site assigned to a triangular protrusion which becomes an energy director. In the case of using a laser, a high-output semiconductor laser or a YAG laser may be preferred, and welding can be performed by forming the insulating outer circumferential part from a laser-transmitting composition and irradiating the laser while applying a pressure to the site to be welded. In addition, the corrugated electrically conducting flow path part and a frame body corresponding to the insulating outer circumferential part may also be joined with an adhesive.

(Single Cell Unit for Fuel Cell)

The single cell unit for a fuel cell of the present invention is obtained, in one preferred embodiment, by stacking the above-described fuel cell separator comprising a corrugated electrically conducting flow path part and an insulating outer circumferential part, and an MEA having in the outer circumference thereof a frame body comprising an insulating thermoplastic resin composition. More specifically, the cell has a single cell structure comprising a stack structure where a fuel cell separator is disposed on both surfaces of one MEA.

(Cell Unit)

The cell unit of the present invention has at least one single cell structure, usually a plurality of single cell structures, and is obtained by stacking the above-described separator comprising a corrugated electrically conducting flow path part and an insulating outer circumferential part, and an MEA having in the outer circumferential part thereof a frame body comprising an insulating thermoplastic resin composition, and performing welding of the gas seal part and welding of the outer circumferential part by means of an energy source selected from an ultrasonic wave, a laser, a high-frequency wave, an infrared ray and an electricity, thereby effecting the integration. In particular, a method selected from laser welding, ultrasonic wave welding and electrical energization welding may be preferred, because welding can be partially performed.

Figure 10:
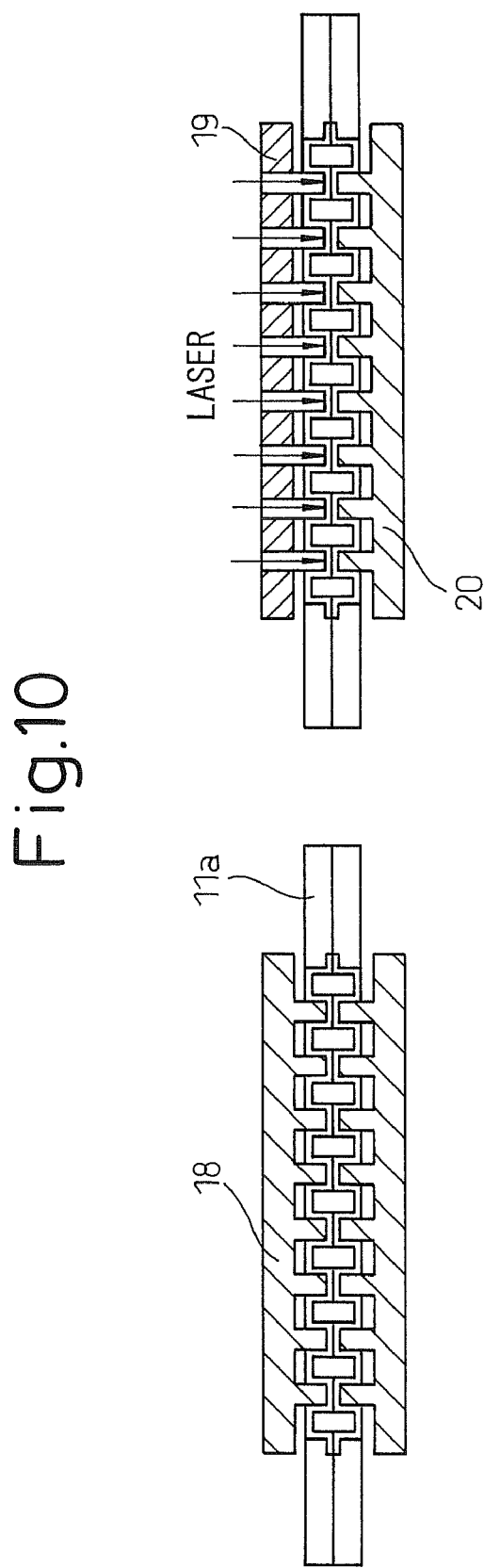
FIG. 10 is a view for explaining one example of the heat-welding method.

In the electrical energization welding, electrical conductivity is partially imparted to the surface seal part (a region of the insulating outer circumferential part) 16 as shown in FIG. 9 to allow for electric energization, a pressure is applied to the superposed seal parts, and a current is passed from both ends, whereby only the portion to which the current is passed can be melted and welded. The electrical conductivity can be imparted to the seal part 16 by sputtering, coating, printing, lamination of a metal mesh, or the like. In the case of laser welding, a pigment capable of absorbing the laser is coated on the seal part of the insulating outer circumferential part surface, and the seal parts are welded by irradiating the laser in a pressure-applied state. In the case of using an ultrasonic wave, a triangular protrusion which becomes an energy director is provided in the site to be welded, and the seal parts 16 are welded by contacting an ultrasonic wave horn with the triangular protrusion in a pressure-applied state. In addition, the seal parts 16 may be (bonded using an adhesive. For the purpose of reducing the contact resistance between two separators 11a, it may be more preferred that an electrically conducting part comprising a multilayer sheet with the surface layer intended to be welded having a melting point lower than that of the center layer is used and groove bottoms are heat-welded using a hot plate 18 or a laser as shown in FIG. 10.

Figure 11:
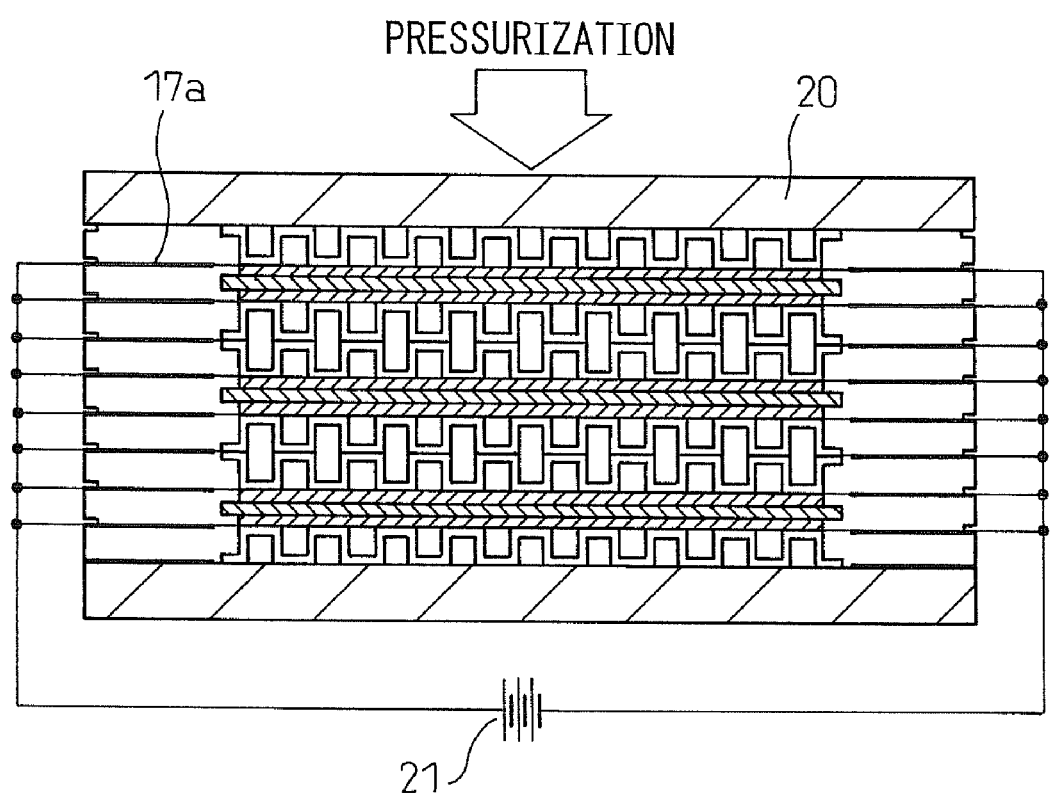
FIG. 11 is a view showing one example of the method for producing the cell unit (single cell unit or short stack unit) for a fuel cell of the present invention by electrical energization welding.

Also, when single cells are stacked as shown in FIG. 11 by using the separator of the present invention and after connecting a terminal 17a to the portion to be welded by electrical energization, weld-sealed by passing a current at a burst under pressure, the cell unit can be produced in a short time and this may be preferred. Furthermore, when the insulating outer circumferential part is formed of an insulating resin composition having a compressive permanent strain of 80% or less (in accordance with JIS K6301, test conditions: 70° C., 25% compressive strain, 500 hours), the seal property is enhanced and therefore, the stack may be fabricated by clamping it after stacking, without heat-welding the stack.

Figure 12:
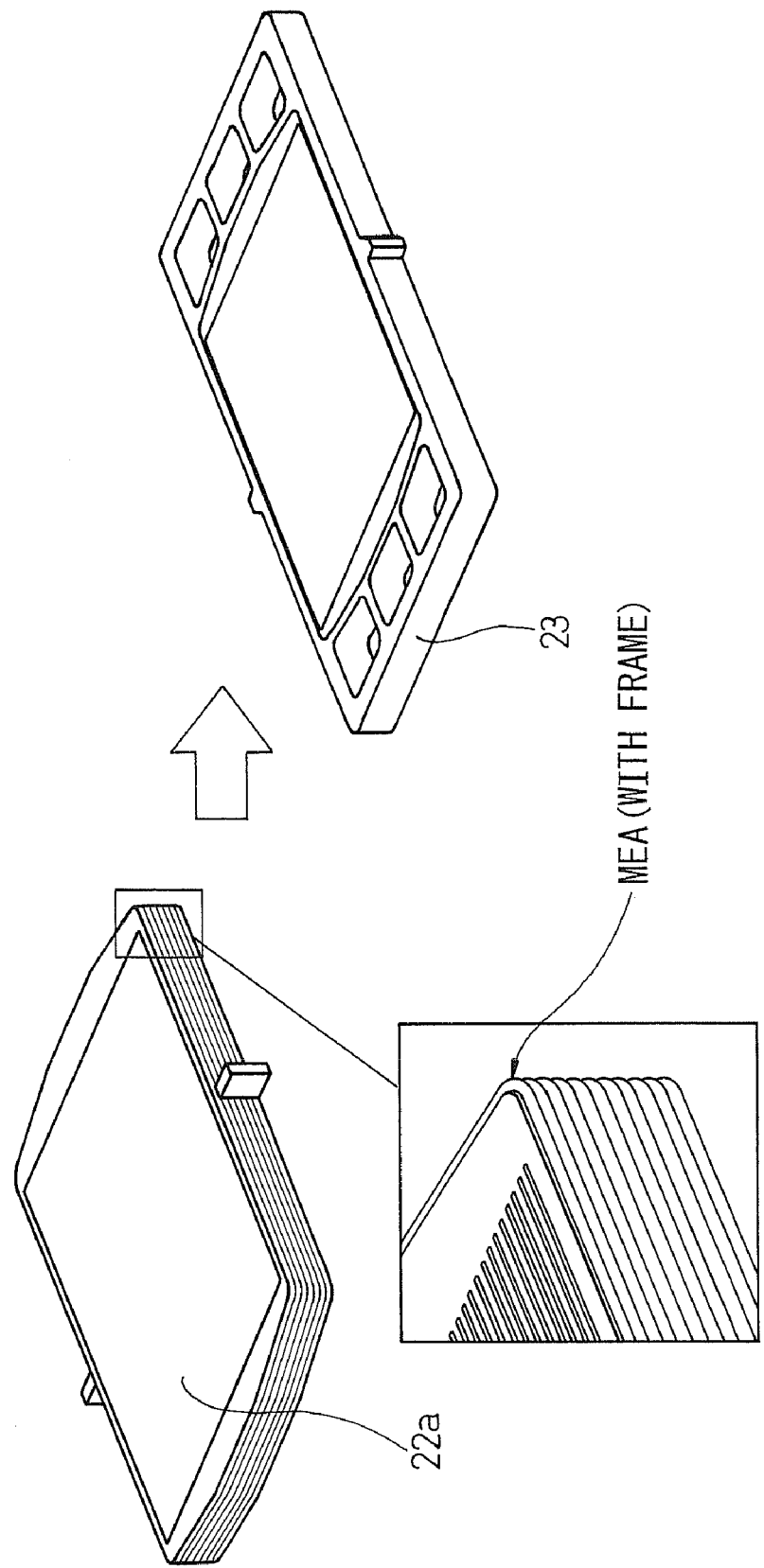
FIG. 12 is a view for explaining one example of the method for producing the insulating outer circumferential part of the cell unit (single cell unit or short stack unit) for a fuel cell of the present invention by injection molding.

The cell unit of the present invention may also be obtained by inserting the electrically conducting flow path part and an MEA in the stacked state into a mold and injection molding the insulating outer circumferential part. For example, as shown in FIG. 12, a stacked body of the electrically conducting flow path part and an MEA 22a is inserted into a mold cavity and the insulating outer circumferential part is injection molded to form the cell unit.

Figure 13:
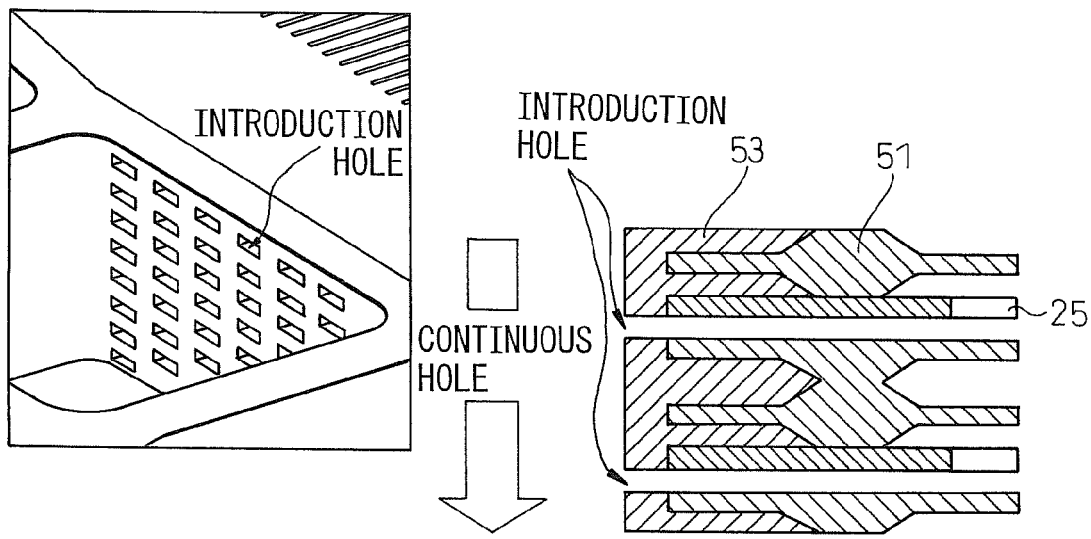
FIG. 13 is a view for explaining one example of the introduction holes for introducing a gas or refrigerant from an internal manifold penetrating in the stacking direction the insulating outer circumferential part of the cell unit (single cell unit or short stack unit) for a fuel cell of the present invention to the flow path provided in the electrically conducting flow path part.

Thereafter, as shown in FIG. 13, an introduction hole for feeding the gas or refrigerant to the electrically conducting flow path part 51 from a manifold (continuous hole) is processed. The processing method of the introduction hole is not particularly limited, but the introduction hole may be processed by a machining with a drill or the like or by a laser processing. Alternatively, the insulating outer circumferential part 53 may be injection molded in the state of a pin being previously fitted in and thereafter, the pin may be withdrawn to open an introduction hole.

EXAMPLES

The present invention is described in greater detail below by referring to Examples, but the present invention is not limited to these Examples.

Example 1

As the carbonaceous material, a non-needle coke, MC Coke, produced by MC Carbon K.K. was coarsely ground to a size of 2 to 3 mm by a pulverizer (manufactured by Hosokawamicron Corp.), and the coarsely ground product was finely ground by a jet mill (IDS2UR, manufactured by Nippon Pneumatic Mfg. Co., Ltd.) and then adjusted to a desired particle diameter by classification. The particle of 5 µm or less was removed by air classification using a turbo-classifier (TC15N, manufactured by Nisshin Engineering Inc.). Subsequently, 0.15 kg of boron carbide ($B_4C$) was added to a part (14.85 kg) of the finely ground product after the adjustment above and mixed in a Henschel mixer at 800 rpm for 5 minutes, and 1 kg of the mixture was sealed into a 1.5 liter-volume graphite crucible with a cover. The crucible was then placed in a graphitizing furnace with a graphite heater and after the inside of the furnace was once vacuumized and replaced with an argon gas, the powder was graphitized at an inner pressure of 1.2 atm and a temperature of 2,800° C. under a stream of argon gas atmosphere. The powder was further left standing to cool in an argon gas atmosphere and then taken out to obtain 0.94 kg of Graphite Fine Powder (A1). The average particle diameter of the obtained graphite fine powder was 20 µm.

Thereafter, 85 mass % of Graphite Fine Powder (A1), 14.3 mass % of polypropylene (PP; SunAllomer (registered trademark) PX201N, produced by SunAllomer Ltd.) and 0.7 mass % of hydrogenated styrene butadiene rubber (H-SBR; Dynaron (registered trademark) 1320P, produced by JSR Corp.) were kneaded in a pressure kneader (MIX-LABO, manufactured by Moriyama Co., Ltd.) at a temperature of 200° C. and 40 rpm for 5 minutes to obtain Graphite Resin Composition (C1).

The obtained graphite resin composition was formed into a sheet having a width of 60 mm and a thickness of 3 mm at a molding temperature of 210° C. by using a φ40 single-screw extruder (manufactured by Tanabe Plastics Machinery Co., Ltd.). Furthermore, the sheet heated at 210° C. was sent to a mill roll at 100° C. and rolled to obtain a sheet having a width of 100 mm and a thickness of 1 mm.

Figure 14:
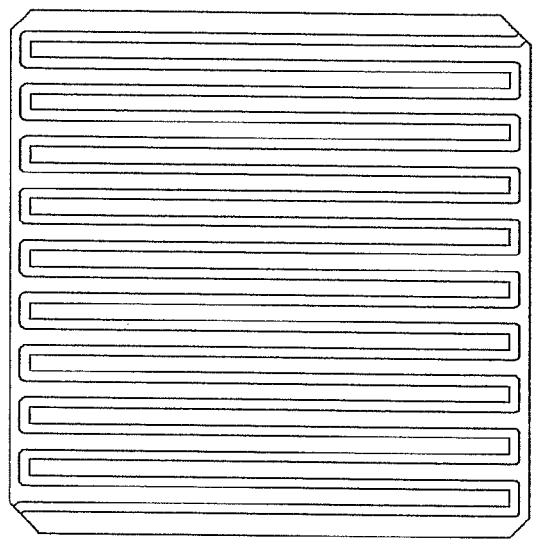
FIG. 14 is a schematic view showing one example of the serpentine flow path of the separator for a fuel cell obtained in the Examples of the present invention.

The 1 mm-thick sheet was uniformly heated to 240° C. by a halogen lamp (manufactured by Iwasaki Electric Co., Ltd.), and the sheet was further fed in 2 seconds between mold shells at 95° C. disposed in a 50-t press molding machine and stamped under a pressure of output 80% for 3 seconds to form a corrugated electrically conducting flow path part shown in FIG. 14 having an area of 52×52 mm, a groove width of 1 mm, and a groove depth of 0.5 mm, with the flow path on one surface being a serpentine flow path. The recess of the electrically conducting flow path part had a curved shape and in the projection, a flat part was ensured and the offset of the flat part was 0.2 mm. Also, the density was 1.83 g/cm$^3$, the thickness in the thinnest part of the electrically conducting flow path part was 0.3 mm, the maximum thickness/minimum thickness ratio was 1.4, and the contact resistance with carbon paper (TGP-H-060, produced by Toray Industries, Inc.) was 6 mΩcm$^2$.

Figure 15:
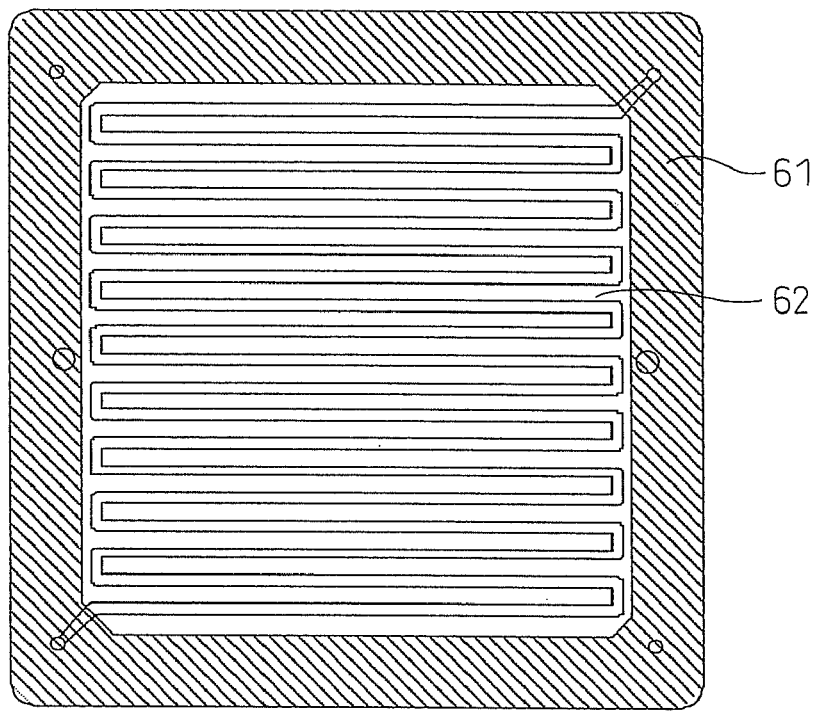
FIG. 15 is an overall schematic plan view of the separator for a fuel cell obtained in the Examples of the present invention.

The electrically conducting flow path part obtained above was inserted into a mold by using an injection molding machine (J100E-P, manufactured by Japan Steel Works, Ltd.), the mold was closed, Insulating Thermoplastic Resin Composition (D1) having the composition shown in Table 1 was injected, and the shaded portion of FIG. 15 was molded to obtain a two-color separator with the frame body being an insulating material. The injection molding was performed under the conditions of a cylinder temperature of 250° C., an injection pressure of 70 MPa, an injection speed of 20 mm/s and a mold temperature of 40° C. The electrically conducting flow path part and insulating outer circumferential part of the obtained two-color separator had a flexural modulus of 8,500 MPa (electrically conducting flow path part) and 620 MPa (insulating outer circumferential part), respectively. The outer dimension of the separator was 65×65×0.8 mm.

TABLE 1

|  | D1 | D2 |  |
| --- | --- | --- | --- |
| SEEPS *1 | 30 | 30 | (Septon 4055, produced by Kuraray) |
| Polypropylene | 34 | 30 | (PM801A, produced by SunAllomer) |
| Process oil | 36 | 36 | (PW150, produced by Idemitsu Kosan) |
| Carbon black | — | 4 | (N330, produced by Cabot Japan) |

*1 Polystyrene-poly(ethylene-ethylene/propylene) block-polystyrene

Figure 16:
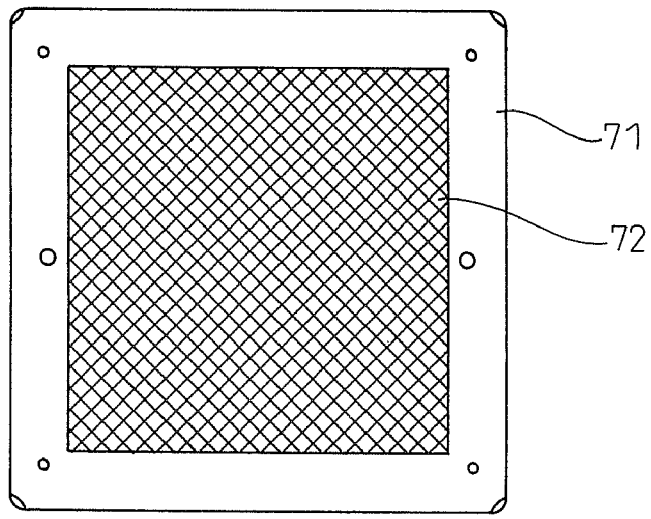
FIG. 16 is an overall schematic plan view showing one example of the MEA used in the present invention.

Furthermore, in order to perform a single cell test, an MEA of 50×50 mm was inserted into a mold, and Insulating Thermoplastic Resin Composition (D2) shown in Table 1 was injected to obtain an integrated MEA shown in FIG. 16 with the insulating frame body 71 being black. In the MEA used, Nafion (registered trademark) 112 (produced by Du Pont) was used for the ion exchange membrane, and a platinum catalyst (TEC10V50E, produced by Tanaka Kikinzoku K.K.) was joined by Pt junction to the anode and the cathode each in an amount of about 0.5 mg/cm$^2$ to provide a power generation part area of 25 cm$^2$ (50×50 mm). By using Teflon (registered trademark)-treated carbon paper (TGP-H-060, produced by Toray Industries, Ltd.) for the gas diffusing electrode, a five-layer structure 72 was fabricated, a five-layer structure where a catalyst was carried (not shown) on the surface of a solid polymer electrolyte membrane (ion exchange membrane), the membrane was sandwiched by carbon paper acting as the gas diffusing layer (electrode), and the outer circumference was covered with an insulating thermoplastic resin composition.

Subsequently, the frame body-integrated MEA was sandwiched by two sheets of the two-color separator obtained above, and the sandwiched assembly was topped with a quartz glass, pressed under a pressure of 1 MPa and welded by laser-irradiating the surfaces one by one with a semiconductor laser such that the circumference of the flow path part was gas-sealed, whereby a single cell with MEA and separator being integrated was produced.

Comparative Example 1

Using the same Graphite Resin Composition (C1) as in Example 1, a sheet having a width of 60 mm and a thickness of 3 mm was extrusion molded at a molding temperature of 240° C. in the same manner. The sheet heated at 210° C. was sent to a mill roll at 100° C. and rolled to obtain a sheet having a width of 100 mm and a thickness of 1.5 mm.

The 1.5 mm-thick sheet was uniformly heated to 240° C. by a halogen lamp, and the sheet was further fed in 2 seconds between mold shells at 95° C. disposed in a 50-t press molding machine and stamped under a pressure of output 80% for 10 seconds to form an electrically conducting flow path part having a flow path symmetric from front to back and a cross-sectional shape shown in FIG. 17, where the area was 52×52 mm, the groove width was 1 mm, the groove depth was 0.5 mm, and the flow path on one surface was a serpentine flow path. The recess of the flow path part did not have a curved shape and in the projection, a flat part was ensured and the offset of the flat part was 2 mm. Also, the density was 1.80 g/cm$^3$, the thickness in the thinnest part of the flow path was 0.3 mm, the maximum thickness/minimum thickness ratio was 4.3, and the contact resistance with carbon paper (TGP-H-060, produced by Toray Industries, Inc.) was 7.1 mΩcm$^2$. The outer dimension of this separator was 65×65×2 mm.

Similar to Example 1, the electrically conducting flow path part obtained above was inserted into a mold by using an injection molding machine (J100E-P, manufactured by Japan Steel Works, Ltd.), the mold was closed, and Insulating Thermoplastic Resin Composition (D1) having the composition shown in Table 1 was injected, whereby a two-color separator with the frame body being an insulating material was obtained. The injection molding was performed under the conditions of a cylinder temperature of 250° C., an injection pressure of 70 MPa, an injection speed of 20 mm/s and a mold temperature of 40° C.

Furthermore, for performing a single cell test, a five-layer structure MEA produced by the method described in Example 1 was sandwiched by two sheets of the two-color separator obtained above, and the sandwiched assembly was topped with a quartz glass, pressed under a pressure of 1 MPa and welded by laser-irradiating the surfaces one by one with a semiconductor laser such that the circumference of the flow path part was gas-sealed, whereby a single cell with MEA and separator being integrated was produced.

FIG. 18 shows a partial cross-sectional view of the integrated single cell produced in Example 1 and Comparative Example 1.

Example 2

As the carbonaceous material, a non-needle coke, MC Coke, produced by MC Carbon K.K. was coarsely ground to a size of 2 to 3 mm by a pulverizer (manufactured by Hosokawamicron Corp.), and the coarsely ground product was finely ground by a jet mill (IDS2UR, manufactured by Nippon Pneumatic Mfg. Co., Ltd.) and then adjusted to a desired particle diameter by classification. The particle of 5 μm or less was removed by air classification using a turbo-classifier (TC15N, manufactured by Nisshin Engineering Inc.). Subsequently, 0.75 kg of vapor grown carbon fiber (hereinafter simply referred to as "VGCF", registered trademark of Showa Denko K.K.) and 0.15 kg of boron carbide ($B_4C$) were added to a part (14.1 kg) of the finely ground product after the adjustment above and mixed in a Henschel mixer at 800 rpm for 5 minutes, and 1 kg of the mixture was sealed into a 1.5 liter-volume graphite crucible with a cover. The crucible was then placed in a graphitizing furnace with a graphite heater and after the inside of the furnace was once vacuumized and replaced with an argon gas, the powder was graphitized at an inner pressure of 1.2 atm and a temperature of 2,800° C. under a stream of argon gas atmosphere. The powder was further left standing to cool in an argon gas atmosphere and then taken out to obtain 0.94 kg of Graphite Fine Powder (A2).

Thereafter, Graphite Resin Composition (C2) was produced by kneading Graphite Fine Powder (A2) together with the polypropylene and hydrogenated styrene butadiene rubber used in Example 1 at the same compositional ratio, and the composition was further formed into a sheet and stamp-molded under the same conditions as in Example 1 to obtain an electrically conducting flow path part having the same corrugated shape as in Example 1. In the obtained separator, the density was 1.82 g/cm$^3$, the thickness in the thinnest part of the flow path was 0.3 mm, the maximum thickness/minimum thickness ratio was 1.4, and the contact resistance with carbon paper (TGP-H-060, produced by Toray Industries, Inc.) was 5.4 mΩcm$^2$. The outer dimension of the separator was 65×65×0.8 mm.

Furthermore, a two-color separator was produced by inserting the electrically conducting flow path part prepared above into a mold and injection molding the insulating outer circumferential part (Insulating Thermoplastic Resin Composition (D1)) in the same manner as in Example 1. Subsequently, a five-layer structure MEA produced by the method described in Example 1 was sandwiched by the two-color separator, and the sandwiched assembly was topped with a quartz glass, pressed under a pressure of 1 MPa and welded by laser-irradiating the surfaces one by one with a semiconductor laser such that the circumference of the flow path part was gas-sealed, whereby a single cell with MEA and separator being integrated was produced.

Comparative Example 2

The same graphite resin composition as that in Example 2 was formed into a sheet and stamp-molded in the same manner as in Comparative Example 1 to obtain an electrically conducting flow path part having the same shape as that in Comparative Example 1. In the obtained electrically conducting flow path part, the density was 1.81 g/cm$^3$, the thickness in the thinnest part of the flow path was 0.3 mm, the maximum thickness/minimum thickness ratio was 4.3, and the contact resistance with carbon paper (TGP-H-060, produced by Toray Industries, Inc.) was 6.8 mΩcm$^2$. The outer dimension of the separator was 65×65×2 mm.

Furthermore, a two-color separator was produced by inserting the electrically conducting flow path part prepared above into a mold and injection molding the insulating outer circumferential part (Insulating Thermoplastic Resin Composition (D1)) in the same manner as in Example 1. Subsequently, a five-layer structure MEA produced by the method described in Example 1 was sandwiched by the two-color separator, and the sandwiched assembly was topped with a quartz glass, pressed under a pressure of 1 MPa and welded by laser-irradiating the surfaces one by one with a semiconductor laser such that the circumference of the flow path part was gas-sealed, whereby a single cell with MEA and separator being integrated was produced.

Example 3

As the carbonaceous material, 14.85 kg of natural graphite (high-purity natural graphite ACP, produced by Nippon Graphite Industries, Ltd., average particle diameter: 24 μm) and 0.15 kg of boron carbide ($B_4C$) were added and mixed in a Henschel mixer at 800 rpm for 5 minutes. Subsequently, 1 kg of the mixture was sealed into a 1.5 liter-volume graphite crucible with a cover, the crucible was then placed in a graphitizing furnace with a graphite heater and after the inside of the furnace was once vacuumized and replaced with an argon gas, the powder was graphitized at an inner pressure of 1.2 atm and a temperature of 2,800° C. under a stream of argon gas atmosphere. The powder was further left standing to cool in an argon gas atmosphere and then taken out to obtain 0.93 kg of Graphite Fine Powder (A3).

Thereafter, 50 mass % of Graphite Fine Powder (A1) produced in Example 1, 35 mass % of Graphite Fine Powder (A3, natural graphite), 13.2 mass % of polypropylene (SunAllomer (registered trademark) PC630A, produced by SunAllomer Ltd.) and 1.8 mass % of propylene α-olefin copolymer (Tafmer (registered trademark) XM-7080, produced by Mitsui Chemicals, Inc.) were kneaded in a pressure kneader (MIX-LABO, manufactured by Moriyama Co., Ltd.) at a temperature of 200° C. and 40 rpm for 5 minutes to obtain Graphite Resin Composition (C3). Subsequently, Graphite Resin Composition (C3) was formed into a sheet having a width of 60 mm and a thickness of 3 mm at a molding temperature of 210° C. by using a φ40 single-screw extruder, and the sheet heated was sent to a mill roll at 100° C. and rolled to obtain a sheet having a width of 60 mm and a thickness of 0.1 mm. Furthermore, the sheet having a width of 60 mm and a thickness of 3 mm of Graphite Resin Composition (C1) extrusion-molded in Example 1 was sandwiched by the sheet of Graphite Resin Composition (C3) above, and the sheet assembly was roll-molded to obtain a three-layer sheet having a width of 100 mm and a thickness of 1 mm (structure (layer thickness): C3 (0.03 mmt)/C1 (0.94 mmt)/C3 (0.03 mmt)).

This three-layer sheet was uniformly heated to 240° C. by a halogen lamp, and the sheet was further fed in 2 seconds between mold shells at 95° C. disposed in a 50-t press molding machine and stamped under a pressure of output 80% for 3 seconds to obtain an electrically conducting flow path part having the same corrugated shape as Example 1. In the electrically conducting flow path part obtained, the density was 1.83 g/cm$^3$, the thickness in the thinnest part of the flow path was 0.3 mm, the maximum thickness/minimum thickness ratio was 1.4, and the contact resistance with carbon paper (TGP-H-060, produced by Toray Industries, Inc.) was 5.4 mΩcm$^2$. Also, Graphite Resin Composition (C1) as the center layer had a flexural modulus of 8,500 MPa and a melting point of 165° C., and Graphite Resin Composition (C3) as the outer layer had a flexural modulus of 6,200 MPa and a melting point of 128° C.

Subsequently, a two-color separator was produced by inserting the electrically conducting flow path part prepared above into a mold and injection molding the insulating outer circumferential part (Insulating Thermoplastic Resin Composition (D1)) in the same manner as in Example 1. The outer dimension of the separator was 65×65×0.8 mm.

(Electric Energization)

Furthermore, for performing a short stack test, an MEA of 50×50 mm was inserted into a mold, and Insulating Thermoplastic Resin Composition (D1) shown in Table 1 was injected to obtain an integrated MEA surrounded by an insulating outer circumferential part. In the MEA used, Nafion (registered trademark) 112 (produced by Du Pont) was used for the ion exchange membrane, and a platinum catalyst (TEC10V50E, produced by Tanaka Kikinzoku K.K.) was joined by Pt junction to the anode and the cathode each in an amount of about 0.5 mg/cm$^2$ to provide a power generation part area of 25 cm$^2$ (50×50 mm). By using Teflon (registered trademark)-treated carbon paper (TGP-H-060, produced by Toray Industries, Ltd.) for the gas diffusing electrode, a five-layer structure was fabricated. Also, an electrically conducting paste (DY-200L-2, produced by Toyobo Co., Ltd.) was printed by screen printing in the portion required to form a gas seal on the surface of the insulating outer circumferential part of the MEA. After the printing, the portion was dried at 80° C. for 30 minutes and then at 130° C. for 20 minutes.

Figure 19:
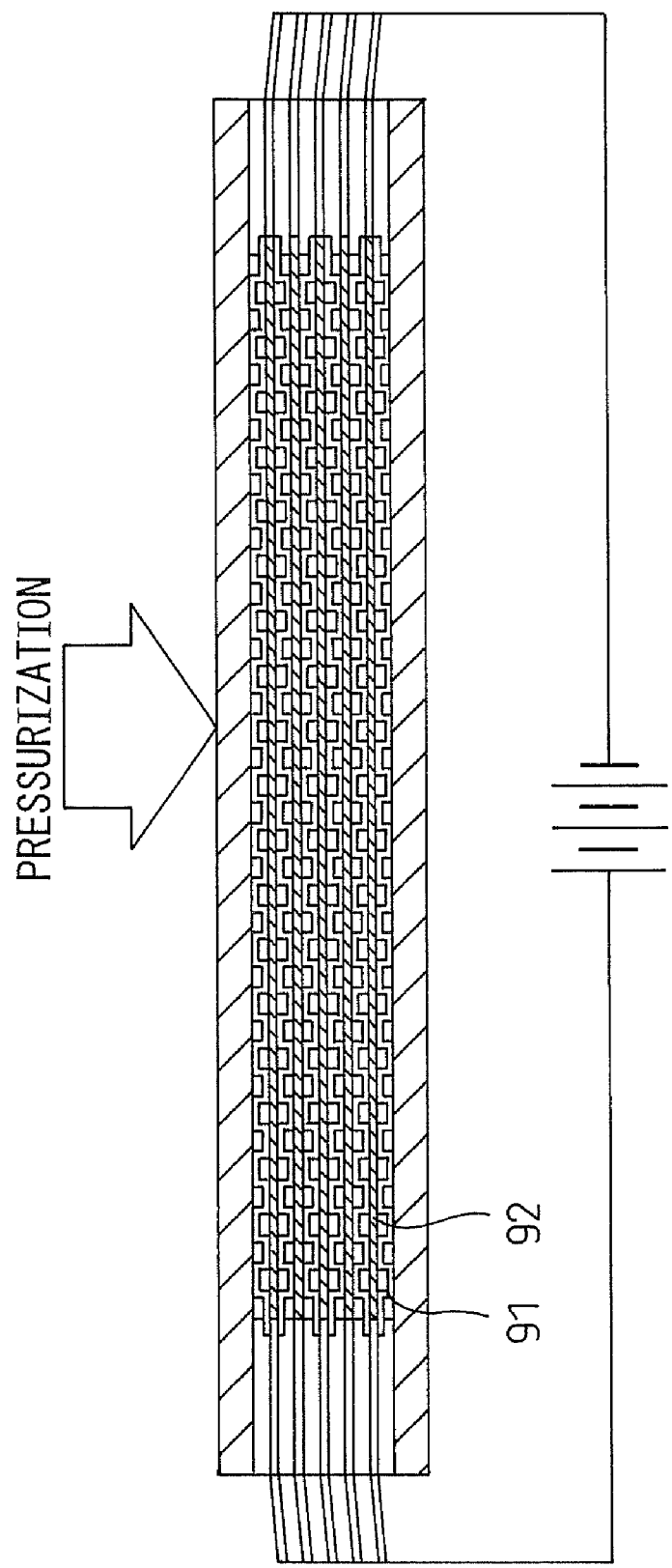
FIG. 19 is a view for explaining one example of the method for welding the insulating outer circumferential part of the cell unit (single cell unit or short stack unit) for a fuel cell of the present invention by electrical energization welding.

Subsequently, as shown in FIG. 19, one sheet of the MEA 92 having printed thereon an electric energization pattern was inserted into respective spaces between adjacent separators in six sheets of the two-color separator 91 prepared above, this sandwiched assembly was further sandwiched by a pressing plate (SUS304) and pressed under a pressure of 5 MPa, and the electrically conducting paste-printed portion was contacted with a terminal and energized at a voltage of 100 V for 20 seconds to weld only the printed portion, whereby a 5-cell unit with separator and MEA being integrated was obtained.

Comparative Example 3

Using the same Graphite Resin Composition (C1) as in Example 1, a sheet having a width of 60 mm and a thickness of 3 mm was extrusion molded at a molding temperature of 210° C. in the same manner. The sheet heated at 210° C. was sent to a mill roll at 100° C. and rolled to obtain a sheet having a width of 100 mm and a thickness of 1.5 mm.

The 1.5 mm-thick sheet was uniformly heated to 240° C. by a halogen lamp, and the sheet was further fed in 2 seconds between mold shells at 95° C. disposed in a 50-t press molding machine and stamped under a pressure of output 80% for 10 seconds to obtain a separator having a flow path symmetric from front to back, in which the flow path had a cross-sectional shape shown in FIG. 17 (FIG. 20 shows an overall view of the separator). The recess of the flow path part did not have a curved shape and in the projection, a flat part was ensured and the offset of the flat part was 2 mm. As for the separator shape, the dimension was 65×65×2 mm, the groove width was 1 mm, the groove depth was 0.5 mm and the flow path on one surface was a serpentine flow path. Also, the density was 1.80 g/cm$^3$, the thickness in the thinnest part of the flow path was 0.3 mm, the maximum thickness/minimum thickness ratio was 4.3, and the contact resistance with carbon paper (TGP-H-060, produced by Toray Industries, Inc.) was 7.1 mΩcm$^2$.

Subsequently, a test of power generation characteristics was performed using the single cell units produced Examples 1 and 2 and Comparative Examples 1 and 2 and the cell unit comprising a stack of five cells produced in Example 3. Furthermore, a single cell was fabricated using the separator of Comparative Example 3, the five-layer structure MEA produced in Example 1 and a 50-μm Teflon (registered trademark) sheet as a gasket and subjected to a test of power generation characteristics.

The power generation test was performed under the conditions of a cell temperature of 80° C., an anode dew point of 80° C., a cathode dew point of 70° C., a hydrogen flow rate of 500 ml/min, an air flow rate of 2,080 ml/min constant, and open-to-air on the outlet side. The temperature of the cell was controlled by attaching a rubber heater.

Figure 21:
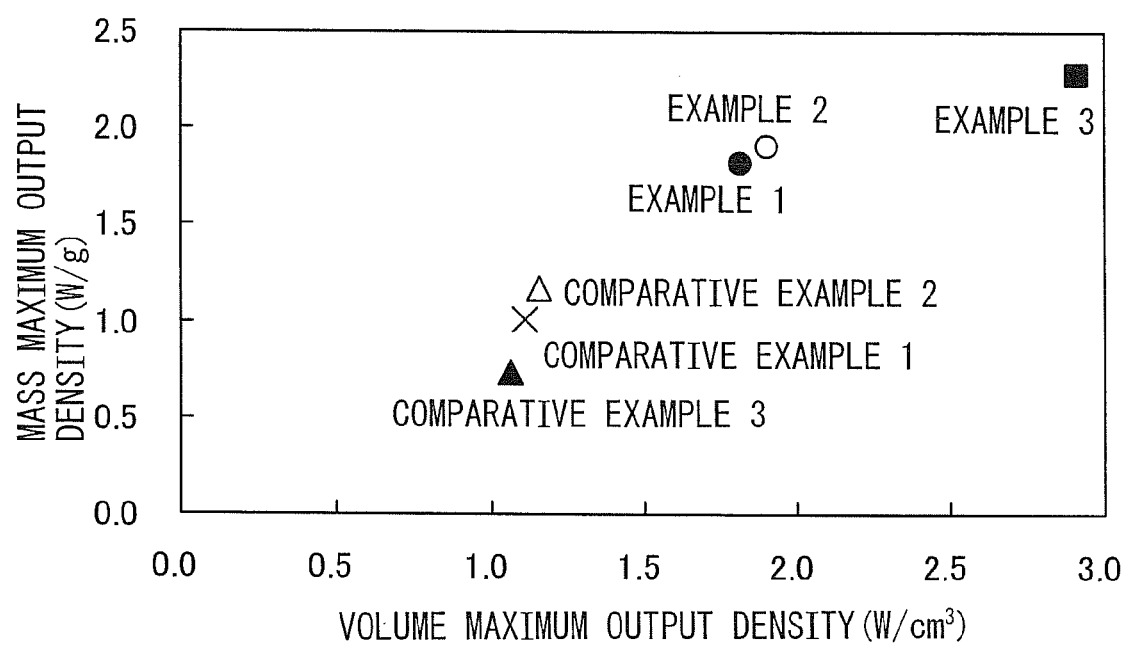
FIG. 21 is a view showing the output test results of the cell units obtained in Examples 1 to 3 and Comparative Examples 1 to 3 of the present invention.

FIG. 21 shows the output test results. Regarding Examples 1 and 2 and Comparative Examples 1 and 2, the unit volume and unit mass were calculated respectively based on the volume and mass of the single cell unit. The unit volume and unit mass of Comparative Example 3 were calculated from the volume and mass of a single cell comprising a separator (two sheets), a five-layer structure MEA (one sheet) and a gasket (two sheets). On the other hand, the results of Example 3 were calculated based on the volume and mass of the 5-cell unit. Accordingly, the results shown in FIG. 21 are the results compared by excluding the volume and mass of the metal plate or current collector plate sandwiching each cell from both sides.

As can been seen from FIG. 21, when the separator of the present invention was used and single cells were unitized by heat welding without using a gasket, the number of parts could be decreased and the cell unit could be lightweighted, so that the maximum output density could be enhanced. Furthermore, by virtue of the corrugated separator formed of a carbon material of the present invention, the thickness of the cell could be reduced and the weight could be more decreased, so that the maximum output density could be greatly enhanced, as compared with a separator in the conventional shape. In particular, by adding a small amount of VGCF, the output density could be more enhanced. In addition, when several cells were stacked and unitized without fabricating a single sell, the enhancement in the output density could be more greatly promoted.

After the power generation test, the cell unit was disassembled and the flow path of the separator was observed, as a result, many water drops tended to remain in Comparative Examples as compared with Examples.

Example 4

Graphite Resin Composition (C1) used in Example 1 was subjected to sheet stamp-molding to form a corrugated electrically conducting flow path part where the area was 52×52 mm, the groove width was 1 mm, the groove depth was 0.5 mm and the flow path on one surface is a serpentine flow path. The density of the electrically conducting flow path part was 1.83 g/cm$^3$, the thickness in the thinnest part of the flow path was 0.3 mm, the maximum thickness/minimum thickness ratio was 1.4, and the contact resistance with carbon paper (TGP-H-060, produced by Toray Industries, Inc.) was 6 mΩcm$^2$.

Subsequently, the electrically conducting flow path part obtained above was inserted into a mold by using an injection molding machine (J100E-P, manufactured by Japan Steel Works, Ltd.), the mold was closed, and Insulating Thermoplastic Resin Composition (D3) having the composition shown in Table 2 was injection molded, whereby a two-color separator comprising an electrically conducting flow path part and an insulating outer circumferential part was obtained. The injection molding was performed under the conditions of a cylinder temperature of 230° C., an injection pressure of 80 MPa, an injection speed of 40 mm/s and a mold temperature of 60° C. Also, the average linear expansion coefficient at 20 to 100° C. of Graphite Resin Composition (C1) was $1.5\times10^{-5}$° $C.^{-1}$, and that of Insulating Thermoplastic Resin Composition (D3) was $3.6\times10^{-5}$° $C.^{-1}$.

TABLE 2

| D3 | | |
|---|---|---|
| Polypropylene | 25 | (PM801A, produced by SunAllomer) |
| Adhesive polypropylene | 15 | (Modic-AP P565, produced by Mitsubishi Chemical) |
| SEBS *2 | 15 | (G1652, produced by Kraton Polymers Japan) |
| Aluminum borate whisker | 45 | (Alborex YS3A, produced by Shikoku Chemicals) |

*2 Styrene ethylene-butylene styrene block copolymer

Comparative Example 4

Linear Expansion Coefficient

Comparison of Separation Test

The electrically conducting flow path part produced in Comparative Example 1 was inserted into a mold, and a homo-PP (polypropylene, PM801A, produced by SunAllomer) as the material for the insulating outer circumferential part was injection molded, whereby a two-color separator with the electrically conducting flow path part and the insulating outer circumferential part being integrated was obtained. The injection molding was performed under the conditions of a cylinder temperature of 230° C., an injection pressure of 80 MPa, an injection speed of 40 mm/s and a mold temperature of 40° C. Also, the average (linear expansion coefficient at 20 to 100° C. of Graphite Resin Composition (C1) was $1.5\times10^{-5}$° $C.^{-1}$, and that of Insulating Thermoplastic Resin Composition (D3) was $14\times10^{-5}$° $C.^{-1}$.

The separators produced in Example 4 and Comparative Example 4 were placed in a thermo-hygrostat, and a heat cycle test from 0° C. to 120° C. at a humidity of 70% was performed to evaluate the durability of the interface and the effect of the linear expansion coefficient. As a result, even when the sample of Example 3 was evaluated up to 500 cycles, abnormality was not observed at the interface between the electrically conducting flow path part and the insulating outer circumferential part. On the other hand, the separator sample of Comparative Example 3 was broken at the 52th cycle due to separation in the interface between the electrically conducting flow path part and the insulating outer circumferential part.

Example 5

Figure 22:
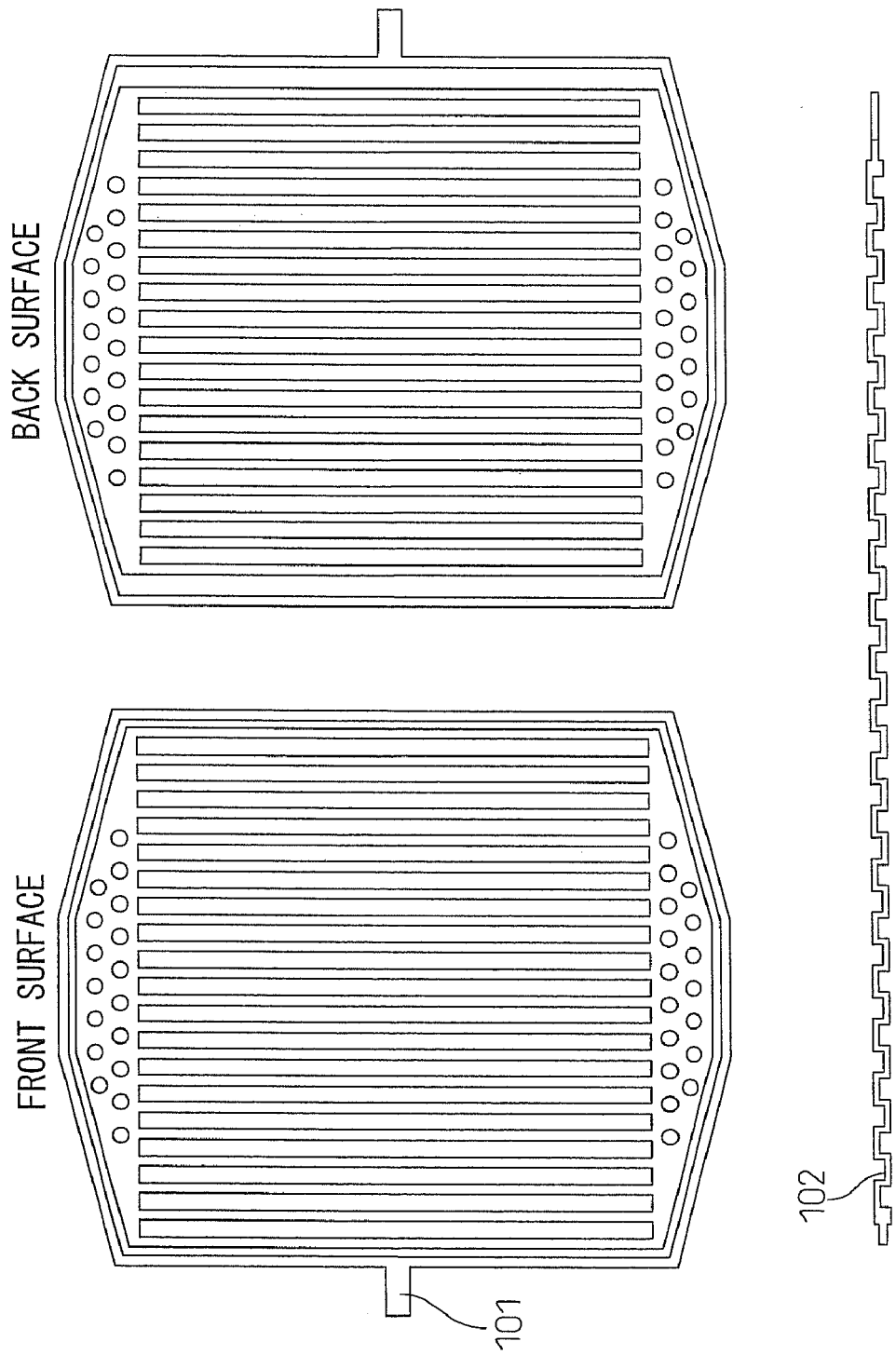
FIG. 22 is a schematic view of the electrically conducting flow path part used in Example 5 of the present invention.

The three-layer structure sheet produced in Example 3 comprising Electrically Conducting Resin Compositions (C1) and (C3) and having a layer structure of (C3)/(C1)/(C3) was uniformly heated to 240° C. by a halogen lamp, the sheet was fed in 2 seconds between mold shells at 95° C. disposed in a 50-t press molding machine, and a corrugated electrically conducting flow path part shown in FIG. 22 was formed by the molding method of stamping the sheet under a pressure of output 80% for 3 seconds. The electrically conducting flow path part had an area of 33.2 cm² and an entire thickness of 0.8 mm, and the groove for a flow path had a width of 1 mm and a depth of 0.5 mm. The recess of the groove in this electrically conducting flow path part had a curved shape and in the projection of the groove, a flat part was ensured and the offset of the flat part was 0.2 mm. Also, the density of the electrically conducting flow path part was 1.83 g/cm³, the thickness in the thinnest part of the corrugated flow path was 0.3 mm, the maximum thickness/minimum thickness ratio was 1.4, and the contact resistance with carbon paper (TGP-H-060, produced by Toray Industries, Inc.) was 5 mΩcm².

Figure 23:
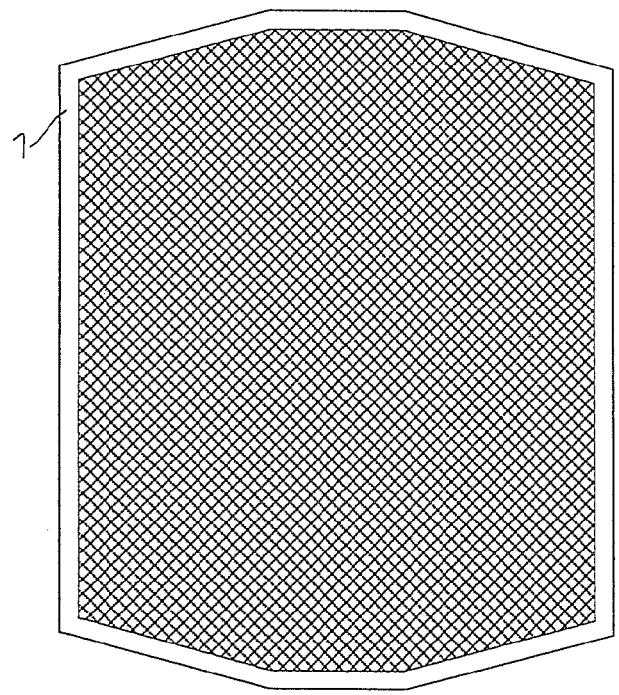
FIG. 23 is a schematic view of the MEA used in Example 5 of the present invention.

Separately, an MEA was inserted into a mold and subsequently, an insulating outer circumferential part comprising Insulating Thermoplastic Resin Composition (D2) shown in Table 1 was formed by an injection molding machine to produce an MEA member having the shape shown in FIG. 23, where the MEA and the insulating outer circumferential part 1 were integrated. In the MEA used here, Nafion (registered trademark) 112 (produced by Du Pont) was used for the ion exchange membrane, and a platinum catalyst (TEC10V50E, produced by Tanaka Kikinzoku K.K.) was joined by Pt junction to the anode and the cathode each in an amount of about 0.5 mg/cm². Furthermore, Teflon (registered trademark)-treated carbon paper (TGP-H-060, produced by Toray Industries, Ltd.) was joined as the gas diffusing electrode, whereby a five-layer structure MEA was fabricated. The area in the reaction part of the MEA was 29.4 cm².

Figure 24:
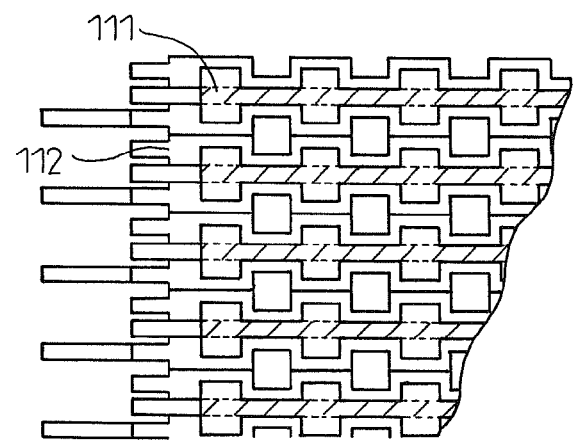
FIG. 24 is a partial schematic cross-sectional view (stacked state) of the cell unit for a fuel cell produced in Example 5 of the present invention.
Figure 25:
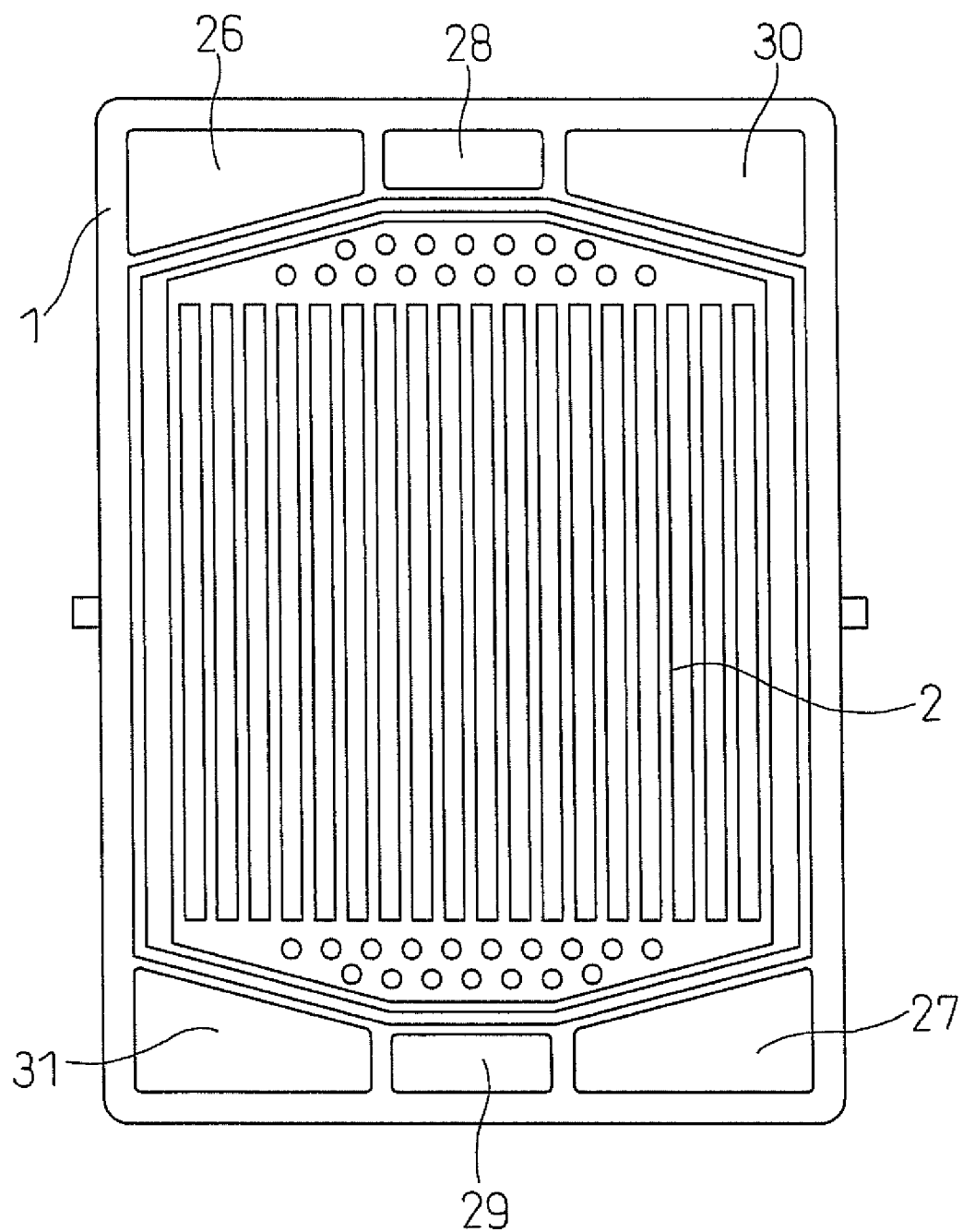
FIG. 25 is an overall schematic plan view (after injection molding of the insulating outer circumferential part) of the cell unit for a fuel cell produced in Example 5 of the present invention.
Figure 28:
FIG. 28 is a schematic cross-sectional view of the separator for a fuel cell, where a conventional flow path is provided symmetrically from front to back.

Using the electrically conducting flow path part (FIG. 22) and MEA member (FIG. 23) produced above, 10 single cells each obtained by sandwiching the MEA member 111 with the electrically conducting flow path part 112 were stacked as shown in FIG. 24 and while applying a pressure of 2 MPa from both surfaces, the stack was kept at 135° C. for 10 minutes, whereby only the surface layer of the electrically conducting flow path part was melted and joined. Subsequently, the resulting cell stacked body was inserted into a mold, and Insulating Thermoplastic Resin Composition (D1) was injected using an injection molding machine (J100E-P, manufactured by Japan Steel Works, Ltd.) to produce a cell unit comprising 10 cells shown in FIG. 25. The injection molding was performed under the conditions of a cylinder temperature of 250° C., an injection pressure of 70 MPa, an injection speed of 20 mm/s and a mold temperature of 40° C. The outer dimension of the cell unit was 60×82×20 mm.

Also, gas/refrigerant introduction holes for introducing a gas or refrigerant from gas/refrigerant manifolds (continuous holes) 26, 28, 30 to the power generation region of the electrically conducting flow path part 2 was produced by the method shown in FIG. 26. In other words, ϕ0.3 pins 32 were previously embedded after the cells were stacked, the insulating outer circumferential part 1 was injection molded in that state, and the embedded pins 32 were withdrawn after the molding to produce introduction holes 34.

Comparative Example 5

Using a 0.3 mm-thick copper plate, an electrically conducting flow path part having the same corrugated shape as in Example 5 was formed by a forging pressing machine. The electrically conducting flow path part was then electrolytically gold-plated to a thickness of about 2 μm so as to prevent corrosion. The electrically conducting flow path part had an area of 33.2 cm² and an entire thickness of 0.6 mm, and the groove for a flow path had a width of 1 mm and a depth of 0.5 mm. The recess of the groove in this electrically conducting flow path part had a curved shape and in the projection of the groove, a flat part was ensured and the offset of the flat part was 0.1 mm. Also, the density of the electrically conducting flow path part was 8.92 g/cm³, the thickness in the thinnest part of the corrugated flow path was 0.2 mm, the maximum thickness/minimum thickness ratio was 1.4, and the contact resistance with carbon paper (TGP-H-060, produced by Toray Industries, Inc.) was 0.3 mΩcm².

Using the copper-made electrically conducting flow path part and the MEA member produced in Example 5, 10 single cells were stacked in the same manner as in Example 5. Subsequently, φ0.2 mm pins 32 were embedded into the cell stacked body in the portion working out to the introduction holes 34 from a manifold, the cell stacked body in this state was inserted into a mold, and Insulating thermoplastic Resin Composition (D1) was injected using an injection molding machine (J100E-P, manufactured by Japan Steel Works, Ltd.) to produce a cell unit comprising 10 cells. The injection molding was performed under the conditions of a cylinder temperature of 250° C., an injection pressure of 70 MPa, an injection speed of 20 mm/s and a mold temperature of 40° C. The outer dimension of the cell unit was 60×82×16 mm.

After the injection molding, the embedded pins 32 were withdrawn to produce introduction hole3 34.

Comparison in the volume and weight of the electrically conducting flow path part and the 10-cell unit produced in Example 5 and Comparative Example 5 is shown in Table 3. It is seen from Table 3 that as regards the volume, the electrically conducting flow path part was 0.66 times more compact and the 10-cell unit was 0.8 times more compact in Comparative Example 5, because the electrically conducting flow path part of Comparative Example 5 was thinner. However, as regards the weight, the electrically conducting flow path part could be 0.31 times more lightweight and the 10-cell unit could be 0.46 times more lightweight in Example 5.

TABLE 3

| | Electrically Conducting Flow Path Part | | 10-Cell Unit | |
|---|---|---|---|---|
| | Volume (cm³) | Weight (g) | Volume (cm³) | Weight (g) |
| Example 5 | 1.31 | 2.40 | 98.4 | 47 |
| Comparative Example 5 | 0.87 | 7.76 | 78.7 | 102 |

The 10-cell units produced in Example 5 and Comparative Example 5 were then subjected to a test of power generation characteristics.

The power generation test was performed under the conditions of a cell temperature of 80° C., an anode dew point of 80° C., a cathode dew point of 70° C., a hydrogen flow rate of 500 ml/min, an air flow rate of 2,080 ml/min constant, and open-to-air on the outlet side. The temperature of the cell was controlled by flowing pure water as the refrigerant.

FIG. 27 shows the output test results. As regards the results in FIG. 27, the unit volume and unit mass were calculated based on the volume and mass of the 10-cell unit (stack). Accordingly, these are the results compared by excluding the volume and mass of the metal plate or current collector plate used as an end plate of the cell unit.

As seen from FIG. 27, the volume maximum output density was larger in Comparative Example 5, because the thickness of the cell unit is smaller in Comparative Example 5 by 4 mm than that in Example 5. However, in Example 5, the interface between the flow path part and the gas diffusing layer and the interface between flow path parts were heat-welded, and the contact resistance in each interface could be reduced, as a result, there was no large difference in the volume maximum output density.

Furthermore, the weight of the electrically conducting flow path part was 5 times greater in Comparative Example 5 than in Example 5 and therefore, the maximum weight output density value was about 2 times greater in Example 5. This reveals that when the shape is the same, use of a carbon-based separator is advantageous in terms of the output density compared with a metal-based separator.

The invention claimed is:

1. A separator for a fuel cell, comprising an electrically conducting flow path part and an insulating outer circumferential part surrounding the electrically conducting flow path part; wherein the electrically conducting flow path part comprises an electrically conducting resin composition comprising a carbonaceous material (A) and a thermoplastic resin composition (B) at a mass ratio (A)/(B) of 1:1 to 20:1 with the total mass of (A) and (B) accounting for 80 to 100 mass % in the composition;

the electrically conducting flow path part has a corrugated shape having a recess and a projection on each of front and back surfaces thereof, where the recess constitutes a groove for a flow path;

the electrically conducting flow path part has a thickness of 0.05 to 0.5 mm and a maximum thickness of the electrically conducting flow path part is from 1 to 3 times a minimum thickness of the electrically conducting flow path part;

the insulating outer circumferential part comprises an insulating thermoplastic resin composition having a volume resistivity of $10^{10}$ Ωcm or more; and the electrically conducting path part and the insulating outer circumferential part are integrated, wherein the thermoplastic resin composition (B) and the insulating thermoplastic resin composition each comprises from 0.05 to 30 mass % of an elastomer component (C), and wherein the average particle diameter of the elastomer component (C) is from 0.01 to 5 μm and is smaller than the average particle diameter or average fiber length of the carbonaceous material (A).

2. The separator for a fuel cell as set forth in claim 1, wherein the thermoplastic resin composition (B) and the insulating thermoplastic resin composition each comprises a crystalline hydrocarbon-based polymer having a melting point of 100° C. or more.

3. The separator for a fuel cell as set forth in claim 1, wherein the carbonaceous material (A) comprises from 0.05 to 5 mass % of boron.

4. The separator for a fuel cell as set forth in claim 1, wherein the carbonaceous material (A) comprises from 0.1 to 50 mass % of at least either one of a vapor grown carbon fiber and a carbon nanotube each having a diameter of 200 nm or less.

5. The separator for a fuel cell as set forth in claim 1, wherein out of the electrically conducting flow path part and the insulating outer circumferential part, both members comprise at least one same polymer, at least one member comprises a compatibilizer, or one member comprises one component working out to a pair of polymers having miscibility or compatibility while another member comprising another component working out to the pair of polymers having miscibility or compatibility.

6. The separator for a fuel cell as set forth in claim 1, wherein in at least either one of the electrically conducting flow path part and the insulating outer circumferential part, the melting point of an outer layer on at least one side out of the front and back surfaces is lower than the melting point of a center layer.

7. The separator for a fuel cell as set forth in claim 1, wherein a flexural modulus of the insulating outer circumferential part is from ⅘ to 1/200 of the flexural modulus of the electrically conducting flow path part.

8. The separator for a fuel cell as set forth in claim 1, wherein an average linear expansion coefficient of the insulating outer circumferential part is from 1/7 to 7 of the average linear expansion coefficient of the electrically conducting flow path part.

9. The separator for a fuel cell as set forth in claim 1, wherein a first projection is provided on the front surface and a first recess is provided on the back surface at a location opposite the first projection, and wherein a second projection is provided on the back surface and a second recess is provided on the front surface at a location opposite the second projection.

10. The separator for a fuel cell as set forth in claim 9, wherein the first recess constitutes a first groove for a first flow path and the second recess constitute a second groove for a second flow path, and wherein the first and second flow paths are alternately arrayed in a plane that is perpendicular to a plane extending from the front surface to the back surface.

11. The separator for a fuel cell as set forth in claim 1, wherein a terminal for measuring a cell voltage is protruded from the electrically conducting flow path part to the outside of the insulating outer circumferential part.

12. The separator for a fuel cell as set forth in claim 1, wherein the density of the electrically conducting flow path part is from 1.2 to 2.5 g/cm$^3$.

13. The separator for a fuel cell as set forth in claim 1, wherein the recess of the electrically conducting flow path part has a curved shape in the cross section and the projection has a flat surface.

14. The separator for a fuel cell as set forth in claim 1, wherein in the cross section of the electrically conducting flow path part, an offset allowing flat surfaces of the projections to overlap by from 0.05 to 0.5 mm between front and back surfaces is provided.

15. The separator for a fuel cell as set forth in claim 1, wherein the thermoplastic resin composition (B) and the insulating thermoplastic resin composition each comprises a component having a glass transition temperature of −20° C. or less.

* * * * *